(12) United States Patent
Feng et al.

(10) Patent No.: US 10,678,465 B2
(45) Date of Patent: Jun. 9, 2020

(54) SEAMLESS MIGRATION OF STORAGE VOLUMES BETWEEN STORAGE ARRAYS

(71) Applicant: EMC IP Holding Company LLC, Hopkinton, MA (US)

(72) Inventors: Changyu Feng, Beijing (CN); Liam Xiongcheng Li, Beijing (CN); Harriet Zhihui Qiu, Beijing (CN); Hongpo Gao, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 27 days.

(21) Appl. No.: 15/987,459

(22) Filed: May 23, 2018

(65) Prior Publication Data

US 2019/0332308 A1 Oct. 31, 2019

(30) Foreign Application Priority Data

Apr. 28, 2018 (CN) .......................... 2018 1 0402355

(51) Int. Cl.
*G06F 3/06* (2006.01)
(52) U.S. Cl.
CPC ............ *G06F 3/0647* (2013.01); *G06F 3/067* (2013.01); *G06F 3/0613* (2013.01)
(58) Field of Classification Search
CPC ...... G06F 3/0647; G06F 3/0613; G06F 3/067; G06F 3/0655; G06F 3/0656; G06F 3/0659
See application file for complete search history.

(56) References Cited

U.S. PATENT DOCUMENTS

| | | | | |
|---|---|---|---|---|
| 7,484,059 B1 * | 1/2009 | Ofer | ...................... | G06F 3/0607 711/162 |
| 7,805,583 B1 * | 9/2010 | Todd | ..................... | G06F 3/0617 711/161 |
| 7,809,912 B1 * | 10/2010 | Raizen | .................. | G06F 3/0617 707/640 |

(Continued)

OTHER PUBLICATIONS

Hogan, C., Pluggable Storage Architecture (PSA) Deep-Dive—Part 1, 2013, available: https://cormachogan.com/2013/02/04/pluggable-storage-architecture-psa-deep-dive-part-1/.*

(Continued)

*Primary Examiner* — Tracy A Warren
(74) *Attorney, Agent, or Firm* — BainwoodHuang

(57) ABSTRACT

While migrating a source volume to a destination storage array, disabling the source volume causes a source storage array to send a non-standard failure status code to all host computers in a cluster that includes the source storage array and the destination storage array. While the source volume is disabled with regard to standard host I/O requests received from host computers in the cluster, in response to receipt of the non-standard failure status code, a customized plugin added to the host computers transfers persistent reservation information to the destination storage array using non-standard read and set persistent reservation information commands. The destination volume is then enabled to process host I/O requests in accordance with the transferred persistent reservation information, and an active path for accessing the source volume is modified in each one of the host computers in the cluster to indicate the destination volume in the destination storage array.

20 Claims, 15 Drawing Sheets

(56) References Cited

U.S. PATENT DOCUMENTS

| | | | | |
|---|---|---|---|---|
| 7,904,681 | B1* | 3/2011 | Bappe | G06F 3/0617 |
| | | | | 711/149 |
| 8,060,710 | B1* | 11/2011 | Don | G06F 3/0617 |
| | | | | 711/161 |
| 8,452,856 | B1* | 5/2013 | Lent | G06F 3/0647 |
| | | | | 709/219 |
| 9,460,028 | B1* | 10/2016 | Raizen | G06F 3/067 |
| 2014/0229638 | A1* | 8/2014 | Zhou | G06F 3/061 |
| | | | | 710/38 |
| 2015/0095445 | A1* | 4/2015 | Thankappan | H04L 45/125 |
| | | | | 709/214 |
| 2017/0228388 | A1* | 8/2017 | Venkat | G06F 3/0604 |
| 2018/0157429 | A1* | 6/2018 | Venkat | G06F 3/0689 |

OTHER PUBLICATIONS

Hogan, C. "Pluggable Storage Architecture (PSA) Deep-Dive—Part 2," 2013, available: https://cormachogan.com/2013/02/05/pluggable-storage-architecture-psa-deep-dive-part-2/.*

Hogan, C. "Pluggable Storage Architecture (PSA) Deep-Dive—Part 3, 2013," available: https://cormachogan.com/2013/02/07/pluggable-storage-architecture-psa-deep-dive-part-3/.*

"What is Pluggable Storage Architecture (PSA) and Native Multipathing (NMP)? (1011375)," VMware, Inc., <<https://kb.vmware.com/s/article/1011375>> accessed Apr. 12, 2018, 2 pages.

Duncan, Lee, "A Tutorial on SCSI-3 Persistent Group Reservations," vol. 1.0, SCSI-3 Persistent Group Reservations Tutorial, SUSE Labs, Dec. 17, 2012, 11 pages.

Weber, Ralph O., "Information technology-SCSI Primary Commands—4 (SPC-4)," Working Draft—Project T10/1731-D, Revision 25, Jun. 23, 2010, pp. 291-308.

* cited by examiner

SEAMLESS MIGRATION OF STORAGE VOLUMES BETWEEN STORAGE ARRAYS

TECHNICAL FIELD

The present disclosure relates generally to intelligent data storage systems, and more specifically to technology for seamlessly migrating data storage volumes between data storage arrays.

BACKGROUND

Storage arrays are arrangements of hardware and software that typically include multiple storage processors coupled to non-volatile data storage devices, such as magnetic disk drives, electronic flash drives, and/or optical drives. The storage processors service host I/O requests received from host applications running on host machines. The received host I/O requests specify one or more logical storage drives commonly referred to as "volumes", and indicate host I/O data that is to be written to or read from the volumes. The storage processors include specialized hardware and execute specialized software that processes the incoming host I/O requests and that performs various data storage tasks that organize and secure the host I/O data that is received from the host applications and stored on non-volatile data storage devices of the storage array.

In a variety of situations, a volume must be migrated from one storage array to another storage array. Such situations may arise when a customer desires to move a volume from an old storage array to a new storage array, e.g. at the time that the customer purchases new hardware, for purposes of achieving performance enhancements, and/or to balance loads across multiple storage arrays.

SUMMARY

Previous technologies for migrating a volume between storage arrays have exhibited significant shortcomings. For example, some previous volume migration technologies have required that host I/O requests directed to the volume being migrated be stopped throughout the migration process. Such approaches have had a significant impact on the operation of host applications, since the host I/O data stored on the volume is unavailable for a significant period of time.

In another example, some previous volume migration technologies have required spoofing of the identity of the source volume that is being migrated, by requiring that a destination volume report the same identity as the source volume to the host, to cause multi-pathing software in the host to treat the source volume and destination volume as different paths to the same volume. This type of approach is a significant challenge for typical storage arrays, and further requires that application software be aware that the identity spoofing is taking place.

In addition, some native multi-pathing software itself may not be easily customizable in a way that provides seamless volume migration without interruption of the flow of host I/O requests.

To address the above described and other shortcomings of previous technologies, new technology is described herein for providing seamless migration of a source volume located in a source storage array to a destination storage array. In the technology described herein, during migration of the source volume to the destination storage array, the source volume is disabled. The disabling of the source volume i) prevents the source volume from being used to process standard host I/O requests, and ii) causes the source storage array to send a non-standard failure status code to all host computers in a cluster that also includes the source storage array and the destination storage array. In response to receipt of the non-standard failure status code, while the source volume is disabled and prior to enabling a destination volume on the destination storage array to process host I/O requests, one of the host computers in the cluster transfers persistent reservation information from the source storage array to the destination storage array. The persistent reservation information includes access reservation information such as the identities of one or more of the host computers in the cluster that are permitted to access the source volume.

In response to a determination that the persistent reservation information has been successfully transferred to the destination storage array, the destination volume is enabled to process host I/O requests in accordance with the transferred persistent reservation information.

In response to a determination that the destination volume has been enabled to process host I/O requests, an active path for the source volume is modified in each one of the host computers in the cluster to indicate a path to the destination volume in the destination storage array. This modification of the active path for the source volume in each one of the host computers in the cluster causes subsequent I/O requests that are directed to the source volume to be sent from the host computers in the cluster to the destination storage array for processing in the destination storage array using the destination volume.

In some embodiments, prior to the source volume being disabled, a hold I/O message may be sent to all host computers in the cluster. The hold I/O message causes the host computers in the cluster to stop sending host I/O requests that are directed to the source volume to the source storage array, and to create an internal queue in each host computer of the host I/O requests that are directed to the source volume. In response to a determination that the active path for the source volume in each one of the host computers in the cluster has been modified to indicate the destination volume, a resume I/O message may be sent to all the host computers in the cluster, the resume I/O message causing the host computers in the cluster to resume sending host I/O requests that are directed to the source volume, including sending the host I/O requests that have been stored in the internal queues of the host computers, albeit now to the destination storage array based on the modified active path for the source volume.

In some embodiments, the host computers in the cluster may each include a multi-pathing component and a customized plugin component that is added to the multi-pathing component. The persistent reservation information transferred to the destination storage array by one of the computers in the cluster may be transferred to the destination storage array by the customized plugin component that is added to the multi-pathing component in at least one of the host computers in the cluster.

In some embodiments, the persistent reservation information further identifies one of the host computers in the cluster that is currently permitted to write to the source volume.

In some embodiments, transferring the persistent reservation information from the source storage array to the destination storage array may include the customized plugin component that is added to the multi-pathing component in the host computers in the cluster obtaining the persistent reservation information from the source storage array at least in part by sending a non-standard read persistent reservations command to the source storage array.

In some embodiments, transferring the persistent reservation information from the source storage array to the destination storage array may include the customized plugin component that has been added to the multi-pathing component in the host computers in the cluster sending the persistent reservation information obtained from the source storage array to the destination storage array by sending a non-standard set persistent reservations command to the source storage array.

In some embodiments, modifying the active path for the source volume in each one of the host computers in the cluster to indicate the destination volume may include modifying an active path associated with the source volume in each one of the host computers in the cluster.

In some embodiments, the destination storage array further includes a migration controller component, and sending the hold I/O message to all host computers in the cluster may include the migration controller component in the destination storage array sending the hold I/O messages to all host computers in the cluster.

In some embodiments, disabling the source volume may include the migration controller component in the destination storage array sending a message to the source storage array that causes the source storage array to prevent the source volume from being used to process standard host I/O requests received from host computers in the cluster.

In some embodiments, disabling the source volume may further cause the source storage array to abort all outstanding host I/O requests in the source storage array that are directed to the source volume and send an I/O failed message to the host computers in the cluster.

In some embodiments, a proxy volume may be created for the destination volume in the destination storage array. The proxy volume for the destination volume processes host I/O requests sent from the host computers in the cluster to the destination storage array and directed to the destination volume at least in part by performing write I/O requests contained in the host I/O requests sent from the host computers in the cluster to the destination storage array on both the destination volume and the source volume. After sending the resume I/O message to all the host computers in the cluster, a copy engine may being copying data from the source volume to the destination volume. When all data has been copied from the source volume to the destination volume, the proxy volume may be removed from the destination storage array so that host I/O requests from the applications in the host computers in the cluster issued over the new active path to the destination storage array and directed to the destination volume are subsequently processed by the destination storage array using the destination volume.

Embodiments of the disclosed technology may provide significant advantages over previous technologies. For example, the disclosed technology does not require that host I/O requests directed by host applications to the volume being migrated be stopped during the migration process, since during the time that the volume being migrated is disabled, the host I/O requests from host applications and directed to the volume being migrated are stored in queues within the host computers until the destination volume is later enabled. As a result, the volume migration does not disrupt the I/O operation of host applications. In another example, the disclosed technology does not require spoofing of the identity of a source volume that is being migrated, and the destination volume need not report the same identity as the source volume to the host. The disclosed technology is accordingly more readily used by typical storage arrays, and does not require that application software be made aware of any identity spoofing. And in another example, the disclosed technology may be embodied using a customized plugin component, which can be used to update multi-pathing software components in a non-disruptive manner, without interrupting the flow of host I/O requests from applications passing through the multi-pathing software.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed upon illustrating the principles of various embodiments of the disclosed technology.

DETAILED DESCRIPTION

Embodiments of the invention will now be described. It should be understood that the embodiments described herein are provided by way of example to illustrate various features and principles of the invention, and that the invention hereof is broader than the specific example embodiments disclosed.

Figure 1:
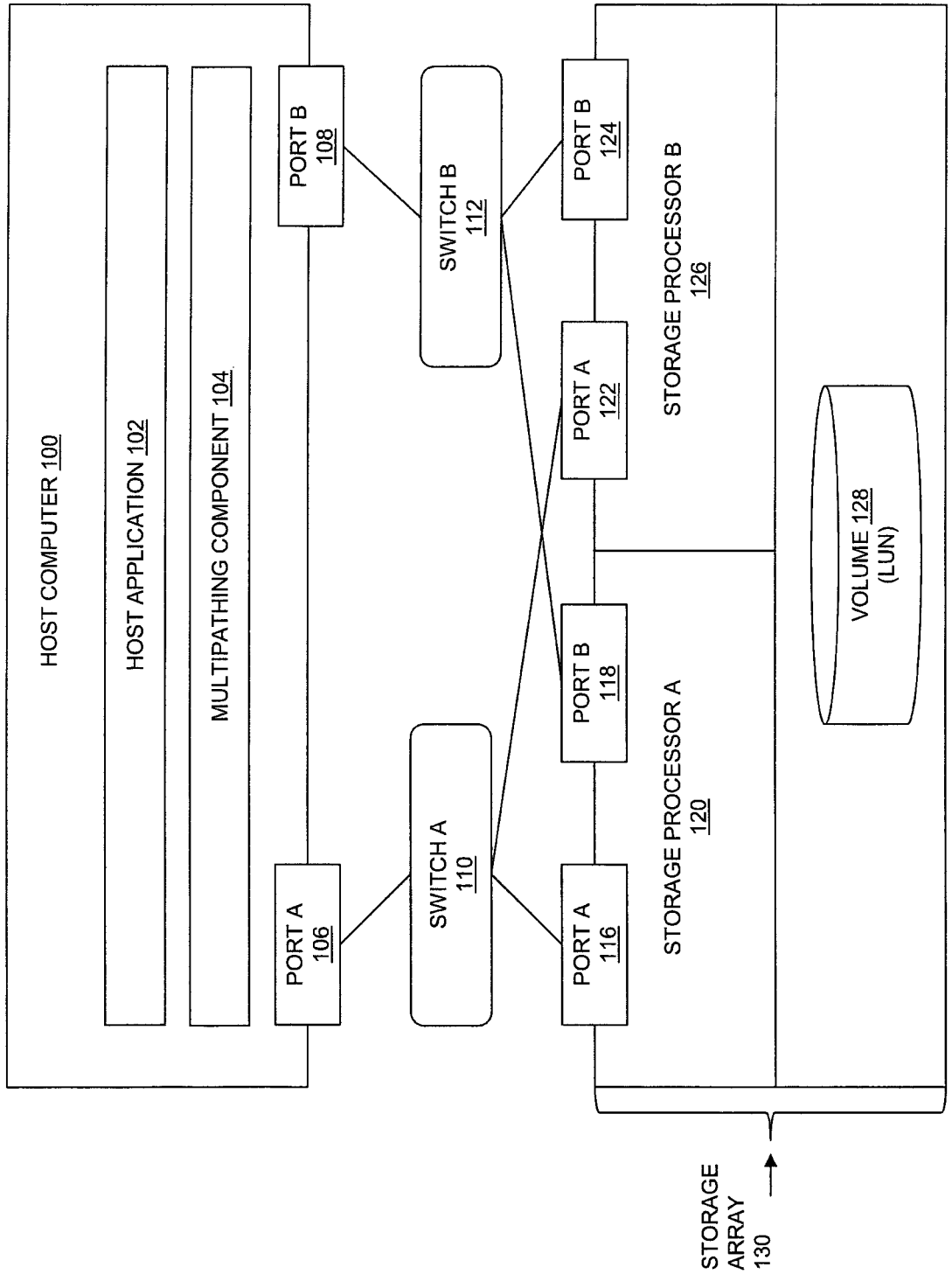
FIG. 1 is a block diagram showing an example of the general operation of a multi-pathing software component executing in a host computer while a host application accesses a volume provided by a storage array using the multi-pathing component.

FIG. 1 is a block diagram showing an example of the general operation of a multi-pathing software system on a host computer. As shown in FIG. 1, a Host Computer 100 includes a Host Application 102, a Multi-pathing Component 104, and two communication ports, Port A 106 and Port B 108. Host Computer 100 is communicably connected to a Storage Array 130 through Switch A 110 and Switch B 112. Storage Array 130 is shown including Storage Processor A 120 and Storage Processor B 124. Storage Processor A 120 has two communication ports, Port A 116 and Port B 118. Storage Processor B 124 also has two communication ports, Port A 122 and Port B 124. Host Application 102 uses data storage provided by Storage Array 130, such as one or more volumes of data storage shown for purposes of illustration by Volume 128, sometimes alternatively referred to as a "logical unit", "LUN", "logical device", or "device".

Figure 2:
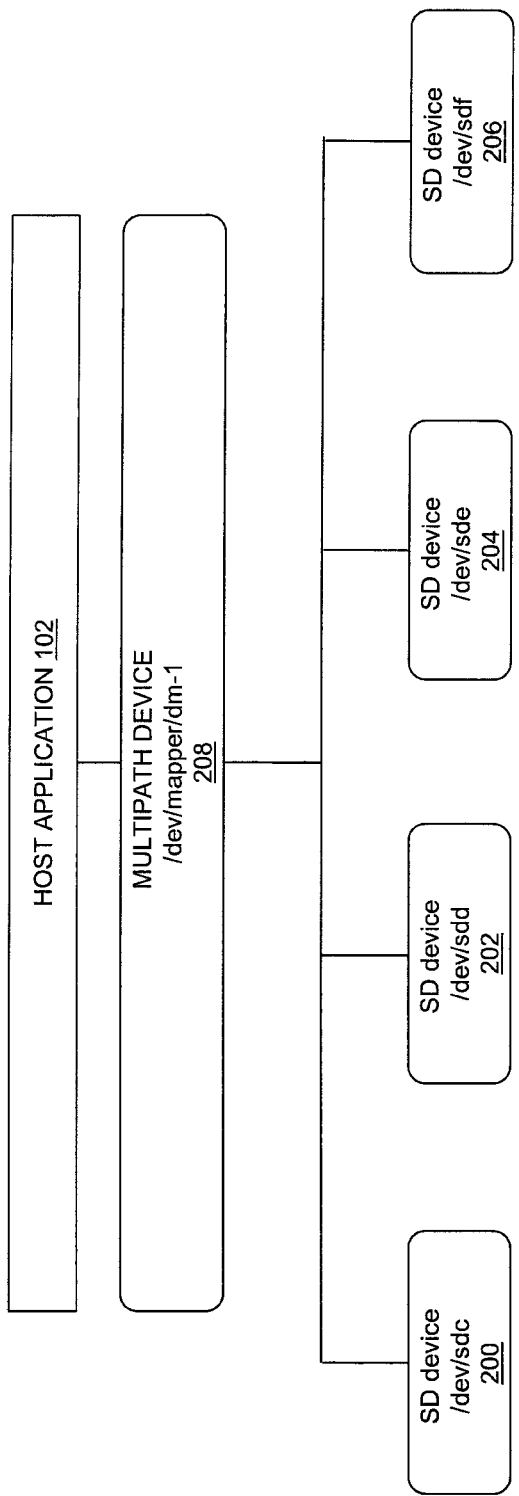
FIG. 2 is a block diagram further illustrating the general operation of the multi-pathing component shown in FIG. 1.

To achieve high availability and load balancing, multiple logical paths are provided between Host Computer 100 and Storage Array 130 and may be used for accessing Volume 128. In the example of FIG. 1, there are four available paths between Host Computer 100 and Storage Array 130 that can be used to access Volume 128: i) a path from Port A 106 through Switch A 110 to Port A 116, ii) a path from Port A 106 through Switch A 110 to Port A 122, iii) a path from Port B 108 through Switch B 112 to Port B 118, and iv) a path from Port B 108 through Switch B 112 to Port B 124. An operating system of Host Computer 100 may treat each different path to Volume 128 as a different volume. Accordingly, the four different paths may be treated by the operating system on Host Computer 100 as four different volumes, e.g. /dev/sdc, /dev/sdd, /dev/sde, /dev/sdf, as for example in systems using the Linux operating system. Multi-pathing software executing on one or more processing units (e.g. CPUs) within the Host Computer 100, shown for purposes of illustration by Multi-Pathing Component 104 in FIG. 1, may map the four volumes understood by the operating system to a single multi-path volume that is exposed to and accessed by the Host Application 102. FIG. 2 further illustrates how Multi-pathing Component 104 may map four different paths that are each considered to be a different volume by the operating system, to a single multi-path volume. Specifically, FIG. 2 shows that SD device /dev/sdc 200, SD device /dev/sdd 202, SD device /dev/sde 204, and SD device /dev/sdf 206, are all mapped by Multi-Pathing Component 104 to a single volume that is exposed to and accessed by Host Application 102, shown for example by Multi-path Device /dev/mapper/dm-1 208.

Multi-Pathing Component 104 detects all "raw" storage devices (aka volumes) that are available on Host Computer 100, and may then use a command such the SCSI (Small Computer System Interface) INQUIRY command to obtain volume information describing individual devices from the storage array that provides the devices (e.g. from Storage Array 130). Multi-Pathing Component 104 determines from this information whether two different devices reported by the operating system are actually the same device, e.g. from an identifier in a Vital Product Data (VPD) portion of the information that is returned for each device. When the Multi-Pathing Component 104 receives a host I/O request issued by Host Application 102, Multi-Pathing Component 104 selects a path from the available paths to the Storage Array 130 on which to send the received host I/O request to Storage Array 130. When a host I/O request fails on a path, Multi-Pathing Component 104 may obtain a specific failure status code commonly referred to as a SCSI "sense" code for that path from the Storage Array 130, and then determine whether to return a failure status for the host I/O request to the Host Application 102, or to choose another available path on which to re-send the host I/O request to Storage Array 130.

In order to provide extendibility, some existing multi-pathing software systems support the addition of plugin components that extend their functionality when operating with specific types of storage arrays. For example, the VMware Native Multipathing Plug-in (NMP) provided by VMware, Inc. is an extendible module within a Pluggable Storage Architecture (PSA) that supports plugins known as sub-plugins, including Storage Array Type Plug-ins (SATPs) and Path Selection Plug-ins (PSPs). In another example, Microsoft® Windows® Multipath I/O (MPIO) multi-pathing system supports extension plugin components referred to as device-specific modules (DSM).

Figure 3:
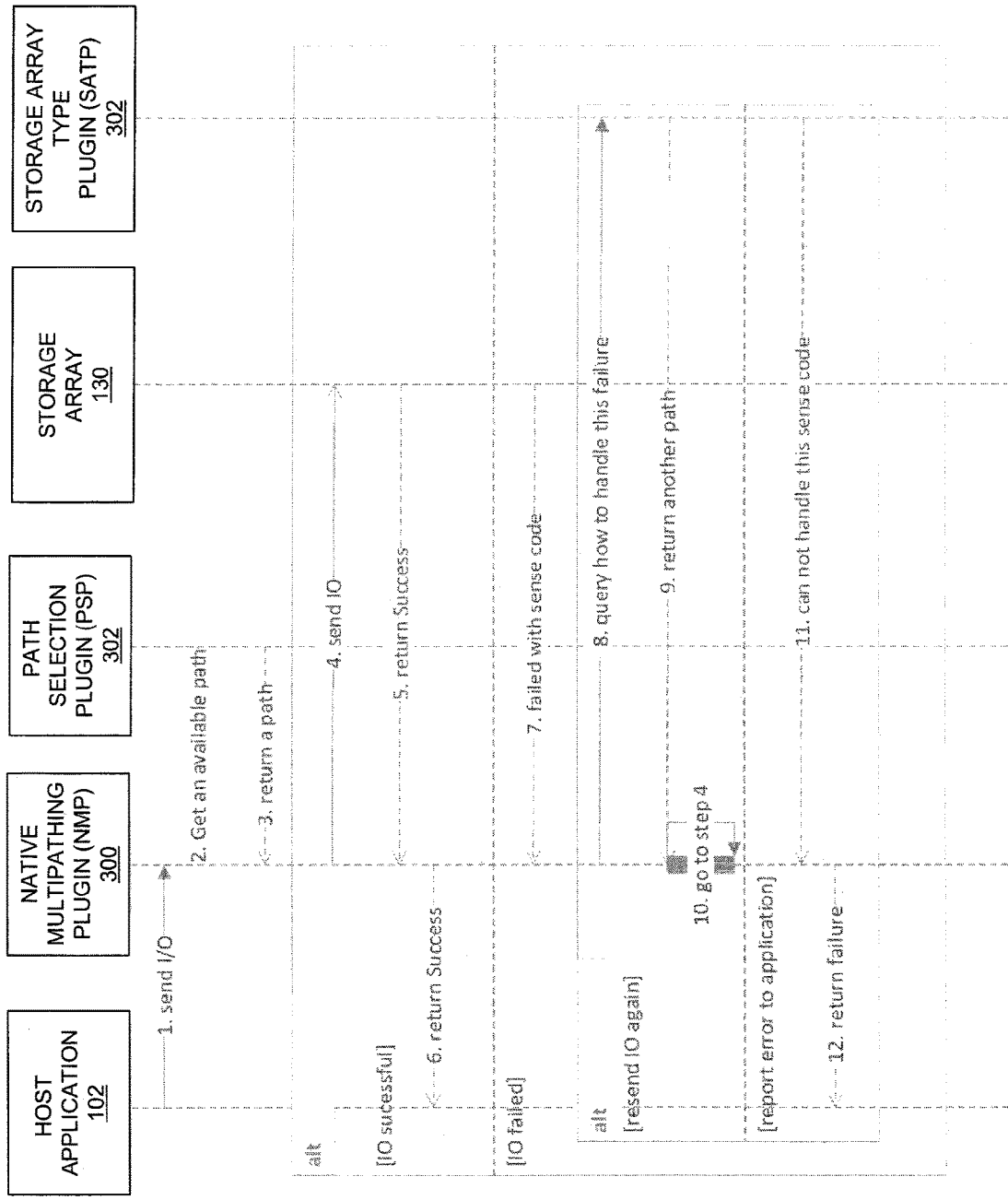
FIG. 3 is a sequence diagram further illustrating the general operation of multi-pathing components such as the multi-pathing component shown in FIG. 1.

FIG. 3 is a sequence diagram illustrating the general operation of multi-pathing components such as the Multi-Pathing Component 104 shown in FIG. 1. Specifically, FIG. 3 shows an operational example in which the Multi-Pathing Component 104 includes a VMware Native Multipathing Plugin (NMP) 300, a Path Selection Plugin (PSP) 302, and a Storage Array Type Plugin (SATP) 302. In the example of FIG. 3, at step 1 Host Application 102 sends a host I/O request to an NMP 300, e.g. a read I/O request or a write I/O request directed to Volume 128. At step 2 the NMP 300 requests an available path to the indicated storage volume from a PSP 302, e.g. a logical path over which to access Volume 128. At step 3 the PSP 302 returns an indication of an available path to Volume 128 to NMP 300. At step 4, NMP 300 uses the path returned by PSP 302 to send the host I/O request to Storage Array 130 for application to Volume 128.

In the case where the host I/O request is successful, Storage Array 130 returns a SUCCESS status to the NMP 300 at step 5, and at step 6 NMP 300 returns a SUCCESS status to Host Application 102. Alternatively, in the case where the host I/O request failed, at step 7 Storage Array 130 may return a sense code for the failed path to NMP 300. At step 8, NMP 300 may query SATP 302 to determine how to handle the type of failure indicated by the sense code returned at step 7.

In the case where the host I/O request is to be re-sent, at step 9 SATP 302 returns to NMP 300 an indication of another path that can be used, causing the NMP 300 at step 10 to go back to step 4 and re-send the host I/O request using the path returned at step 9. Alternatively, in the case where the host I/O request cannot be re-sent, at step 11 SATP 302 returns an indication that the host I/O request cannot be re-sent, causing NMP 300 to return a FAILURE status to Host Application 102 at step 12.

Figure 4:
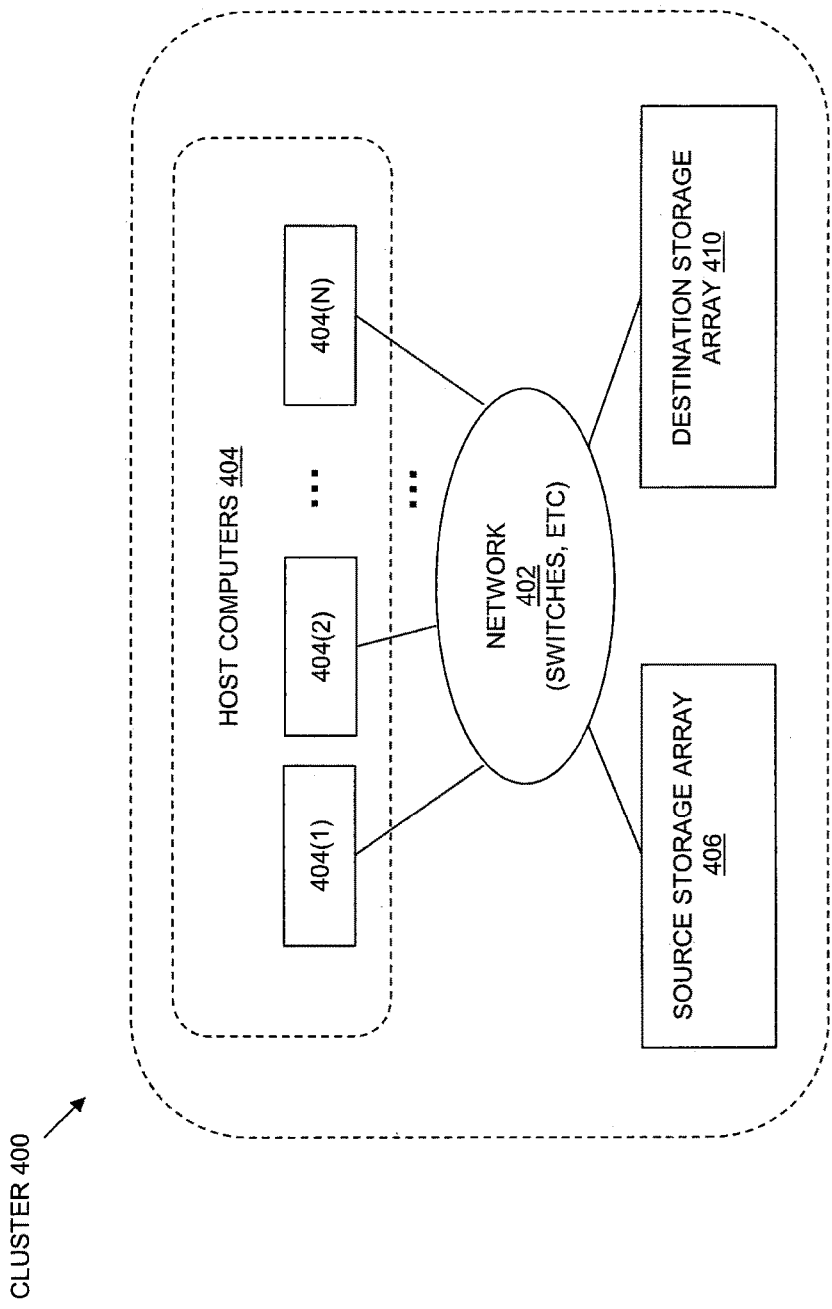
FIG. 4 is a block diagram showing a cluster that includes multiple host computers communicably connected to a source storage array and a destination storage array over a network.

FIG. 4 is a block diagram showing a Cluster 400 that includes multiple Host Computers 404, shown for purposes of illustration in FIG. 4 by Host Computer 404(1), 404(2), and so on through 404(N). The Host Computers 404 are all communicably connected to a Source Storage Array 406 and a Destination Storage Array 410 that are also located in the Cluster 400. During operation of the devices shown in FIG. 4, host applications executing on Host Computers 404 access non-volatile storage provided by Source Storage Array 406 and Destination Storage Array 410 over the Network 402. Each of Source Storage Array 406 and Destination Storage Array 410 may include one or more storage processors provided, for example, as circuit board assemblies, or "blades," which plug into a chassis that encloses and cools the storage processors. The chassis may have a backplane for interconnecting the storage processors, and additional connections may be made among storage processors using cables. No particular configuration is required, and storage processors in Source Storage Array 406 and Destination Storage Array 410 may include or consist of any type of computing device capable of processing received host I/O requests. Non-volatile storage devices in Source Storage Array 406 and Destination Storage Array 410 may, for example, include magnetic disk drives, electronic flash drives, optical drives, and/or other types of drives.

Network 402 may be any type of network or combination of networks, such as, for example, a storage area network (SAN), a local area network (LAN), a wide area network (WAN), the Internet, and/or some other type of network or combination of networks. The Host Computers 404 may, for example, communicate with Source Storage Array 406 and Destination Storage Array 410 over Network 402 using various technologies, such as, for example, iSCSI or Fibre Channel. The storage processors in Source Storage Array 406 and Destination Storage Array 410 are configured to receive host I/O requests from the Host Computers 404 and to respond to such host I/O requests at least in part by reading or writing their respective non-volatile storage devices. The storage processors in Source Storage Array 406 and Destination Storage Array 410 may include one or more communication interfaces, processing units (e.g. CPUs), and memory storing instructions for execution on the processing units. The communication interfaces may include, for example, SCSI target adapters and network interface adapters for converting electronic and/or optical signals received over Network 402 into digital form.

Figure 5:
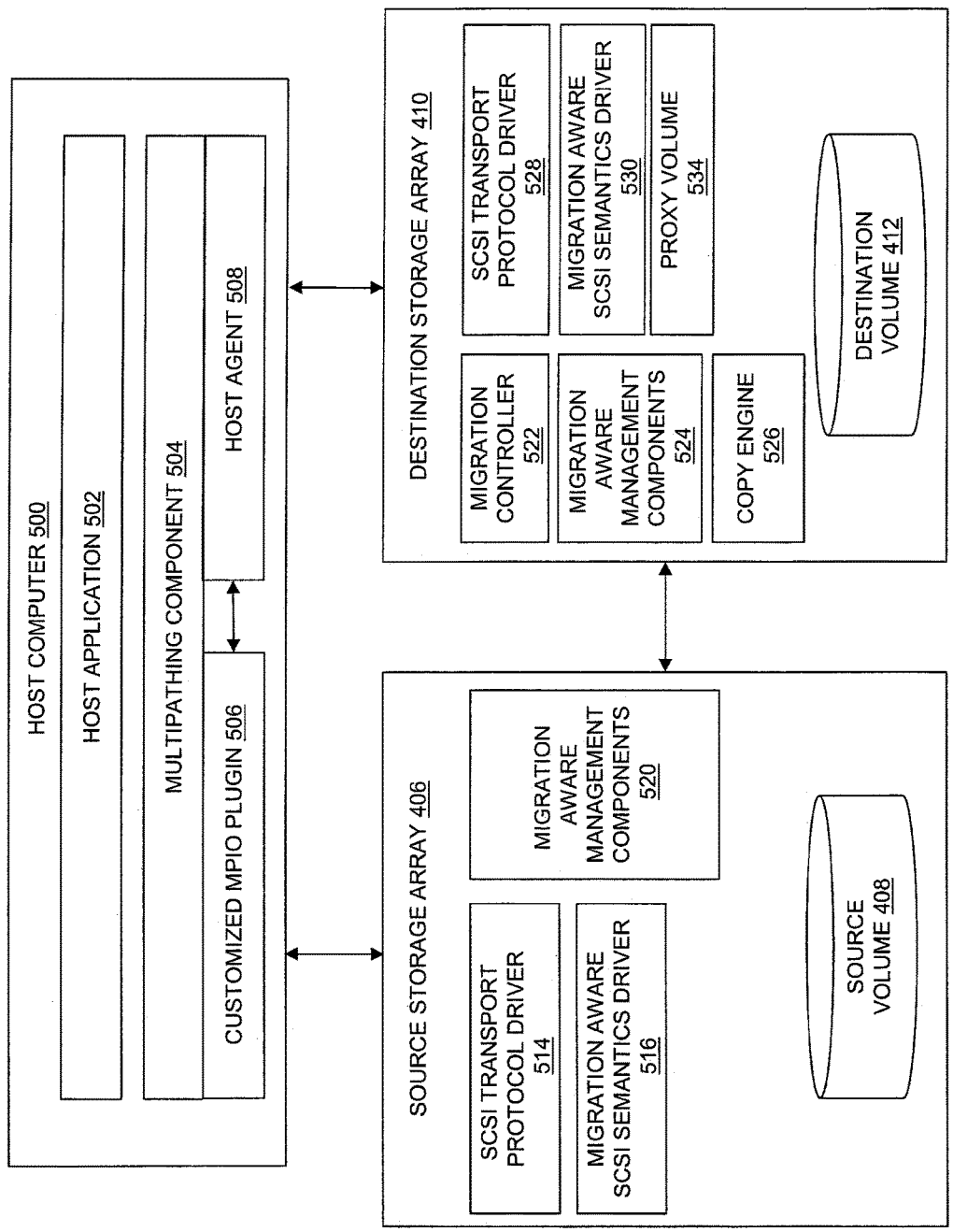
FIG. 5 is a block diagram showing one of the host computers, the source storage array, and the destination storage array in the cluster shown in FIG. 4, and also showing architectural components of an illustrative embodiment.

FIG. 5 is a block diagram showing Host Computer 500, which is an example of one of the Host Computers 404 in FIG. 4, together with the Source Storage Array 406 and the Destination Storage Array 410 also shown in FIG. 4. In the case of multi-pathing software that supports the addition of plugin components, the addition of one or more plugin components to the multi-pathing software does not interrupt the host I/O requests received from host applications. Some embodiments of the disclosed technology operate with such extendible multi-pathing software to provide a non-disruptive solution to migrating a volume between storage arrays by using customized multi-pathing plugins that are seamlessly installed on host computers and that work together with a host migration agent and other components in a source storage array and a destination storage array to seamlessly migrate a volume from one storage array to another storage array.

An example of architectural components in some embodiments of the disclosed technology is shown in FIG. 5. Host Computer 500 may include a Host Application, and a multi-pathing system shown by Multi-Pathing Component 504. In the example of FIG. 5, Multi-Pathing Component 504 may be made up of or include an extendible multi-pathing software system, such as, for example, Microsoft® Windows® Multipath I/O (MPIO) multi-pathing system, and has been extended by the addition of one or more customized, vendor specific plug-ins, e.g. by the addition of device specific modules or "DSMs", shown for purposes of illustration in FIG. 5 by Customized MPIO Plugin 506. Customized MPIO Plugin 506 operates in part by processing host I/O requests that are received from Host Application 502 and directed by Host Application 502 to Source Volume 408 at least during the process of moving Source Volume 408 from Source Storage Array 406 to Destination Storage Array 410.

Customized MPIO Plugin 506 further operates to recognize and perform specific processing in response to receipt of at least one non-standard failure status code, e.g. in response to receipt of a vendor specific sense code from a storage array such as Source Storage Array 406. Such processing performed by Customized MPIO Plugin 506 in response to receipt of the non-standard failure status code may include transferring persistent reservation (PR) information previously defined for Source Volume 408 from Source Storage Array 406 to Destination Storage Array 410. The persistent reservation information may, for example, include indications (e.g. identifiers, names, certificates, network addresses, etc.) of one or more of the host computers in the Cluster 400 that are permitted to access the Source Volume 408, and/or indications of one of the host computers in the Cluster 400 that is currently permitted to write to the Source Volume 408. One example of persistent reservation information is described in Working Draft SCSI Primary Commands-4 (SPC-4), published Jun. 23, 2010.

Figure 6:
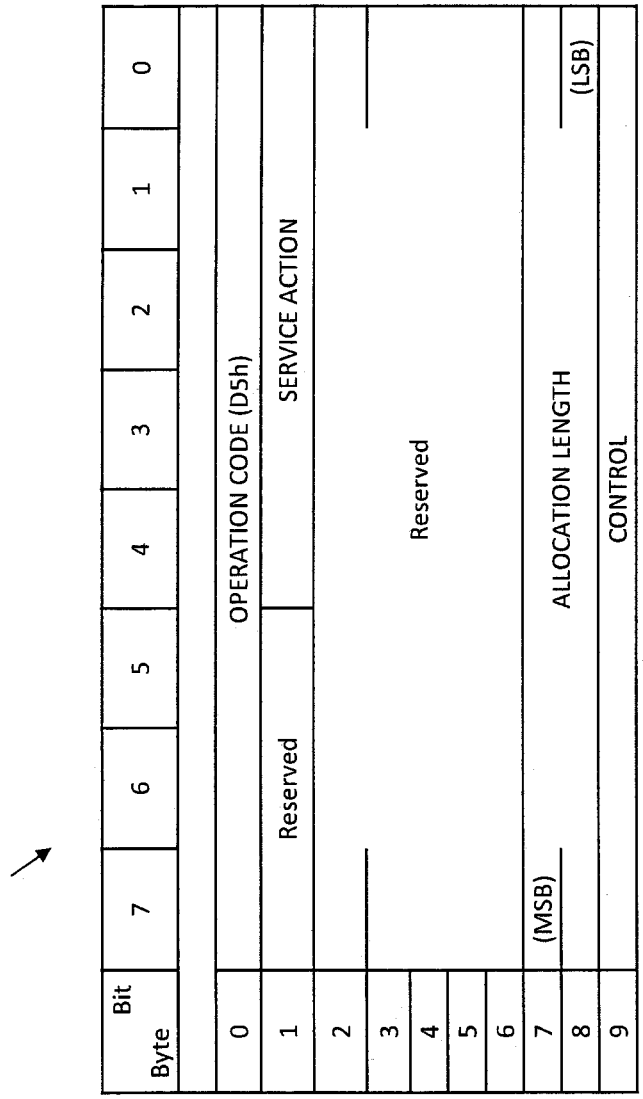
FIG. 6 is a diagram showing an example of a non-standard read persistent reservation information command.

In some embodiments, Customized MPIO Plugin 506 may obtain the persistent reservation information from Source Storage Array 406 at least in part by sending a non-standard read persistent reservation information command to Source Storage Array 406, such as the SUPER PERSISTENT RESERVE IN vendor specific SCSI command 600 shown in FIG. 6.

Figure 7:
FIG. 7 is a diagram showing an example of a non-standard set persistent reservation information command.

In some embodiments, Customized MPIO Plugin 506 may send the persistent reservation information obtained from Source Storage Array 406 to the Destination Storage Array 410 by sending a non-standard set persistent reservation information command to the source storage array, such as the SUPER PERSISTENT RESERVE OUT vendor specific SCSI command 700 shown in FIG. 7.

Host Agent 508 operates by receiving requests from Migration Controller 522 in Destination Storage Array 410, and sending input/output (IOCTL) requests to the Customized MPIO Plugin 506 to cause Customized MPIO Plugin 506 to perform specific operations or functions.

SCSI Transport Protocol Driver 514 and SCSI Transport Protocol Driver 528 may be block front-end drivers, which operate by handling SCSI transport protocol communications between the host computers in Cluster 400 and Source Storage Array 406 and Destination Storage Array 410 respectively. For example, SCSI Transport Protocol Driver 514 and SCSI Protocol Driver 528 may be Fiber Channel (FC) or iSCSI drivers.

Migration Aware SCSI Semantics Driver 516 and Migration Aware SCSI Semantics Driver 530 parse standard SCSI commands received by Source Storage Array 406 and Destination Storage Array 410 from host computers in Cluster 400, and issue SCSI responses to the host computers. Migration Aware SCSI Semantics Driver 516 and Migration Aware SCSI Semantics Driver 530 also operate to handle vendor specific SCSI commands, such as the SUPER PERSISTENT RESERVE IN vendor specific SCSI command 600 shown in FIG. 6, and the SUPER PERSISTENT RESERVE OUT vendor specific SCSI command 700 shown in FIG. 7.

Migration Controller 522 controls and monitors the migration progress, as further described herein.

Migration Aware Management Components 520 and Migration Aware Management Components 524 are control path components that can be called to create volumes and change the volume migration state of individual volumes.

Copy Engine 526 operates to read data stored on Source Volume 408 and write the data read from Source Volume 408 to the Destination Volume 412.

Proxy Volume 534 is a proxy of Destination Volume 412. During the migration process, Proxy Volume 534 receives host I/O requests from the host computers in Cluster 400, sends the received host I/O requests that write I/O requests to Destination Volume 412, and also forwards the received host I/O requests that are write I/O requests to Source Storage Array 406 to also be performed on the Source Volume 408.

In some embodiments, SCSI Transport Protocol Driver 514, Migration Aware SCSI Semantics Driver 516, and Migration Aware Management Components 520 may consist of or include specialized software constructs provided in the form of executable instructions in a memory of a storage processor in Source Storage Array 406, for execution on one or more processing units of the storage processor. Similarly, SCSI Transport Protocol Driver 528, Migration Aware SCSI Semantics Driver 530, Migration Controller 522, Migration Aware Management Components 524, Copy Engine 526, and Proxy Volume 534 may consist of or include specialized software constructs provided in the form of executable instructions in a memory of a storage processor in Destination Storage Array 410, for execution on one or more processing units of the storage processor. Those skilled in the art will recognize that Source Storage Array 406 and Destination Storage Array 410 may further include various other types of software constructs, which are not shown, such as an operating system, various applications, processes, etc.

FIG. 6 is a diagram showing an example of a non-standard read persistent reservation information command that may be used in some embodiments. FIG. 6 shows the SCSI Command Descriptor Block (CMD) format of a SUPER PERSISTENT RESERVE IN vendor specific SCSI command 600 that is an example of a non-standard read persistent reservation information command that may be used in some embodiments. For example, the SUPER PERSISTENT RESERVE IN vendor specific SCSI command 600 may have a unique opcode such as 0xD5.

FIG. 7 is a diagram showing an example of a non-standard set persistent reservation information command that may be used in some embodiments. FIG. 7 shows the SCSI Command Descriptor Block (CMD) format of a SUPER PERSISTENT RESERVE OUT vendor specific SCSI command 700 that is an example of a non-standard set persistent reservation information command that may be used in some embodiments. For example, the SUPER PERSISTENT RESERVE OUT vendor specific SCSI command 700 may have a unique opcode such as 0xD6.

Figure 8:
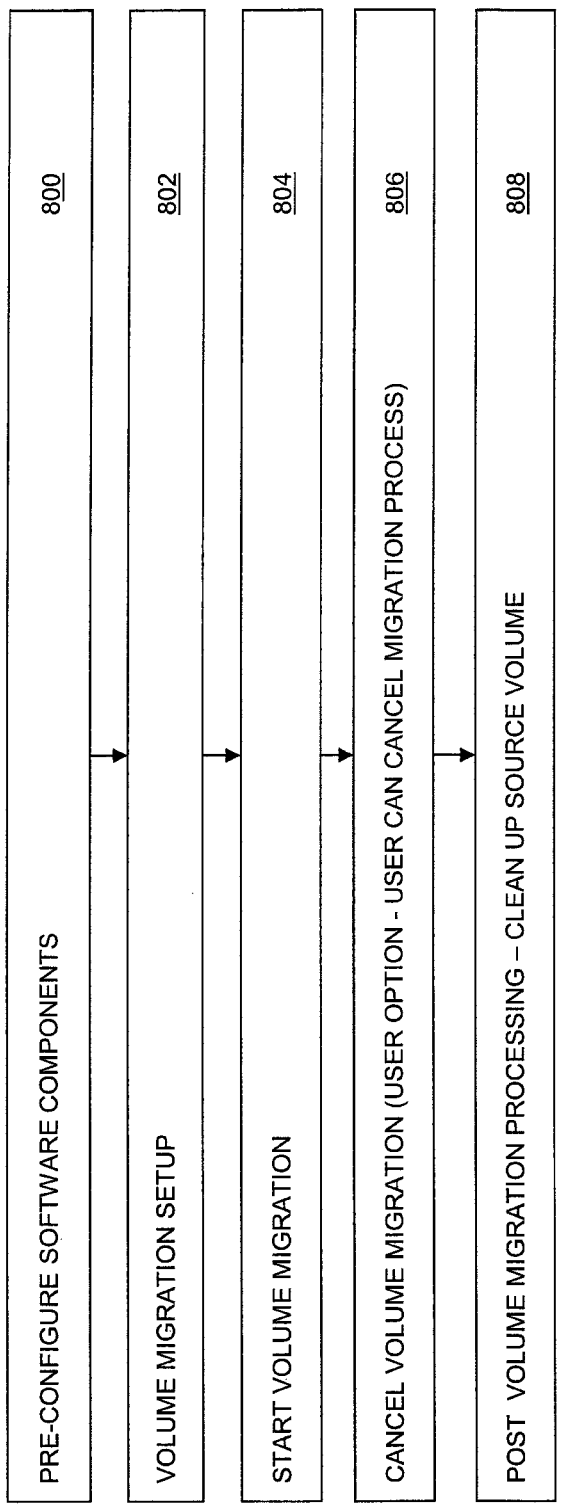
FIG. 8 is a flow chart of steps performed with regard to some embodiments while performing volume migration between storage arrays.

FIG. 8 is a flow chart showing an example of steps performed during operation of some embodiments. As shown in FIG. 8, at step 800 a step of pre-configuring software components is performed. During step 800, software components involved in the disclosed volume migration on the host computers in Cluster 400, Source Storage Array 406, and Destination Storage Array 410, are each updated to a version that can migrate a volume seamlessly, and the network connectivity and control path connectivity needed to perform volume migration is verified and established as needed. For example, by updating the multi-pathing software on each one of the host computers in Cluster 400 to include a copy of Customized MPIO Plugin 506 as part of a Non-Disruptive Upgrade (NDU), such upgrading in step 800 advantageously does not interrupt the processing of host I/O requests issued by the host applications on the host computers in Cluster 400. The software components that may be updated at step 800 may include a Host Agent 508 and a Customized MPIO Plugin 506 on each host computer. Other software components that may be updated at step 800 may include Migration Aware SCSI Semantics Driver 516 and Migration Aware Management Components 520 on Source Storage Array 406, and Migration Aware SCSI Semantics Driver 530, Migration Controller 522, Migration Aware Management Components 425, and Copy Engine 526 on Destination Storage Array 410. Further at step 800, network connectivity may be verified or established between the host computers in Cluster 400 and the Destination Storage Array 410, and a data path may be verified or established between Source Storage Array 406 and Destination Storage Array 410. In addition, control path connectivity may be verified or established between the Migration Controller 522 and Source Storage Array 406 and between the Migration Controller 622 and Host Agent 508, e.g. by operations including providing any necessary credentials to establish such connectivity.

At step 802 the volume migration is setup. Specifically, a user of one of the host computers in Cluster 400 may select a volume at step 802, e.g. Source Volume 408, for migration. Further during step 802, the Proxy Volume 534 may be created on Destination Storage Array 410, and a passive path may be created from each host computer in the cluster to the Destination Storage Array 410.

At step 804, the volume migration is started. The active path for the Source Volume 408 is flipped to indicate the Destination Storage Array 410, in order to re-direct host I/O requests that are directed to Source Volume 408 to follow a path to Destination Storage Array 410, where they are serviced by the Proxy Volume 534, which keeps Source Volume 408 updated during the migration process in case the user cancels the volume migration process.

At step 806, the user is allowed to optionally cancel the volume migration process, since Source Volume 408 is being kept updated throughout the migration process. This allows the user to cancel the migration process if necessary and to go back to using Source Volume 408.

At step 808, post volume migration processing is performed, which may include operations such as cleaning up Source Volume 408 by taking Source Volume 408 offline, and removing the Proxy Volume 534 from Destination Storage Array 410.

Figure 9:
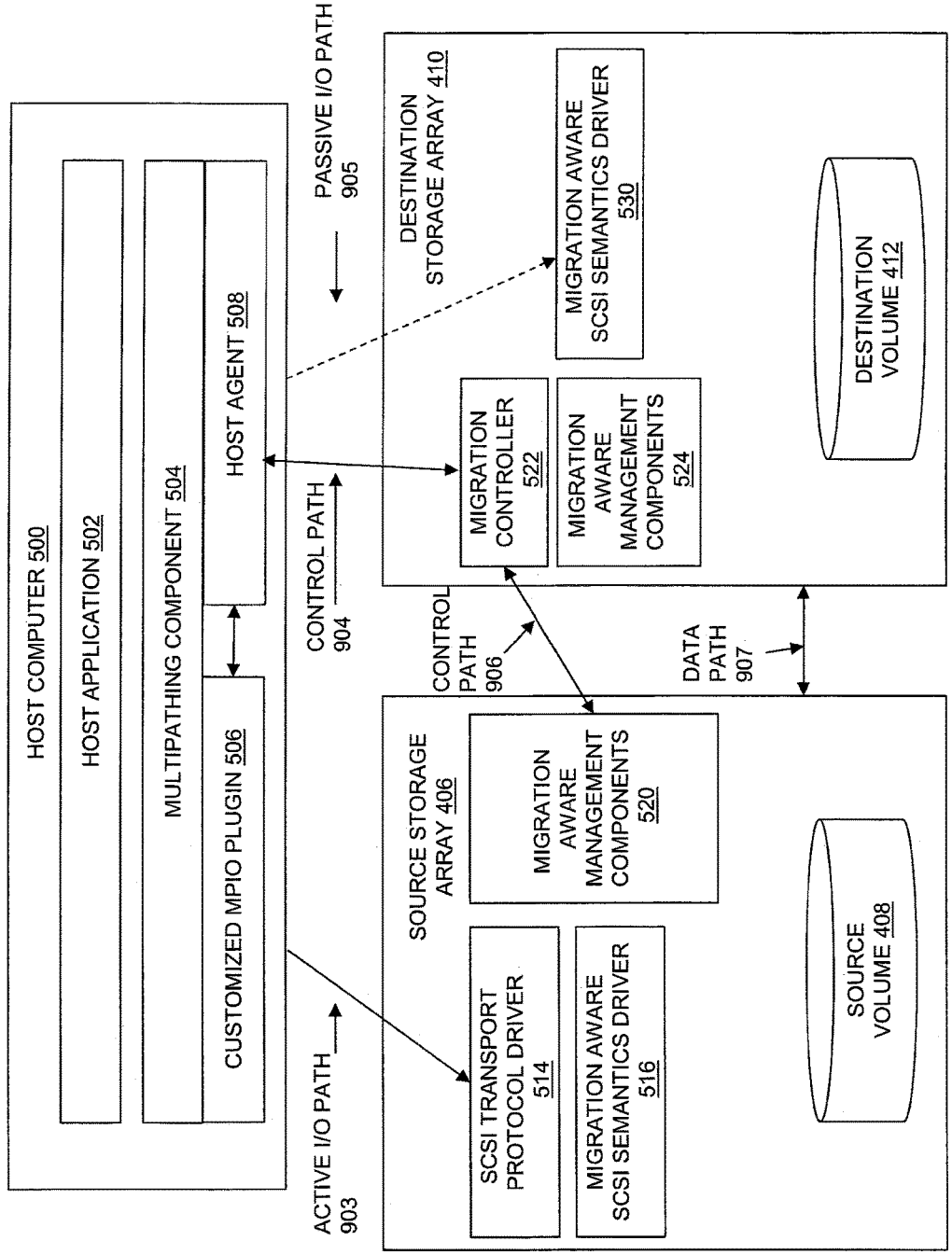
FIG. 9 is a block diagram showing one of the host computers, the source storage array, and the destination storage array in the cluster of FIG. 4, after a step of pre-configuring software components for volume migration.

FIG. 9 is a block diagram showing an example of each one of the host computers in the cluster (illustrated in FIG. 9 by Host Computer 500), Source Storage Array 406 and Destination Storage Array 410, after the step of pre-configuring software components, as in step 800 of FIG. 8. As shown in the example of FIG. 9, an Active I/O Path 903 for Source Volume 408 is present from the Host Computer 500 to Source Storage Array 406, a Control Path is present between Migration Controller 522 and Host Agent 508, a Passive I/O Path 905 is present between Host Computer 500 and Destination Storage Array 410, a Control Path 906 is present between Migration Controller 522 and Migration Aware Management Components 520, and a Data Path 907 is present between Destination Storage Array 410 and Source Storage Array 406.

Figure 10:
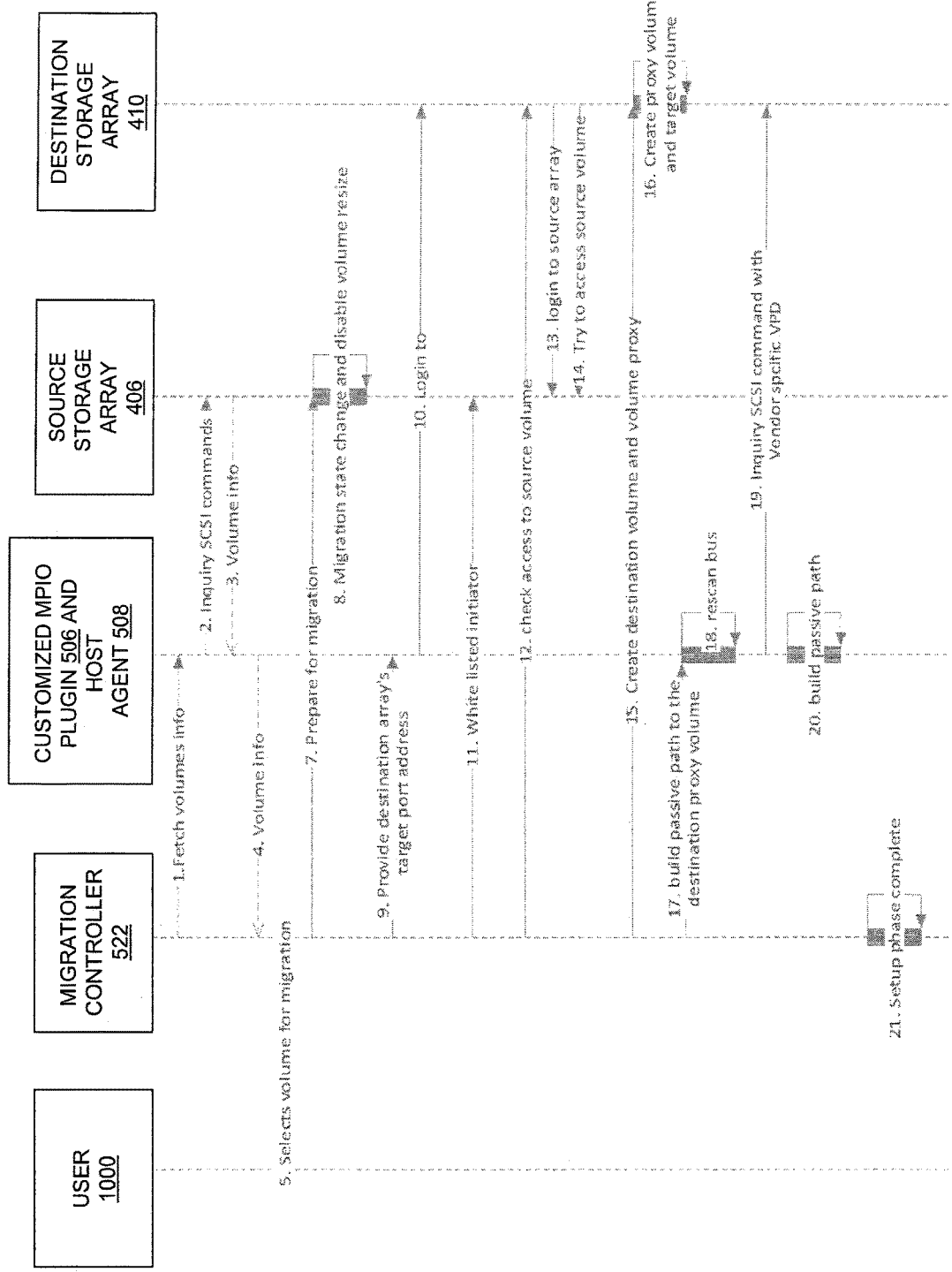
FIG. 10 is a sequence diagram illustrating a step of volume migration setup in some embodiments.

FIG. 10 is a sequence diagram showing an example of steps that may be performed in some embodiments during the step of volume migration setup, as in step 802 of FIG. 8. Customized MPIO Plugin 506 and Host Agent 508 may be present in each one of the host computers in the Cluster 400, including for purposes of illustration the Host Computer 500.

At step 1 of FIG. 10, Migration Controller 522 sends a request for volume information to Host Agent 508. In response to the request from Migration Controller 522 at step 1, at step 2 Host Agent 508 causes the Customized MPIO Plugin 506 to issue one or more SCSI INQUIRY commands to Source Storage Array 406. At step 3, Source Storage Array 406 responds to the SCSI INQUIRY command(s) by sending volume information regarding Source Volume 408 to the Customized MPIO Plugin 506. At step 4, the Host Agent 508 sends the volume information received for Source Volume 408 to Migration Controller 522. After steps 1 through 4 of FIG. 10, a GUI may be presented to a User 1000 (e.g. a system administrator user), displaying all volumes that are located in Source Storage Array 406 that can be migrated to Destination Storage Array 410, including for example Source Volume 408. The User 1000 may then select a volume (e.g. Source Volume 408) through the GUI to start the process of migrating the selected volume to Destination Storage Array 410.

At step 7 Migration Controller 522 sends a message to Source Storage Array 406, indicating that Source Storage Array 406 should prepare Source Volume 408 for migration. In response to the message sent at step 7, at step 8 Source Storage Array 406 changes the migration state of Source Volume 408 to PREPARE_FOR_MIGRATION, which disables volume re-size operations on Source Volume 408, but otherwise continues to allow host I/O requests to be serviced on Source Volume 408. At step 9, Migration Controller 522 sends the target port address of Destination Storage Array 410 to Host Agent 508 in each one of the host computers in the cluster. At step 10, the host computers in the cluster (e.g. Customized MPIO Plugin 506 and/or other components shown in Host Computer 500) each perform a login to the Destination Storage Array 410, so that the host computers can each access a volume that is located on Destination Storage Array 410 (e.g. Destination Volume 412).

At step 11, Migration Controller 522 sends a white list of all relevant initiators on Destination Storage Array 410 to Source Storage Array 406, so that Source Storage Array 406 can subsequently determine whether future I/O requests received by Source Array 406 are originated from the Destination Storage Array 410, to allow I/O requests received from Copy Engine 526 and Proxy Volume 534. After the Source Volume 408 is subsequently disabled (see step 2 of FIG. 12), Source Volume 408 will reject I/O requests received from the host computers in Cluster 400, but will service I/O requests from Destination Storage Array 410. In this way, during volume migration, the Proxy Volume 534 created on the Destination Storage Array 410 will be able to send all write I/O requests it receives to the Source Volume 408 in order to keep the data stored on Source Volume 408 and Destination Volume 412 synchronized, and send all read I/O requests it receives to the Source Volume 408 in order to read the un-migrated data, and Copy Engine 526 will be able to copy data stored on Source Volume 408 to Destination Volume 412.

At step 12, Migration Controller 522 verifies access to the Source Volume 408. At step 13, the Destination Storage Array 410 performs a login operation to Source Storage Array 406, and at step 14 the Destination Storage Array 410 verifies access to Source Volume 408.

At step 15, Migration Controller 522 requests the creation of Destination Volume 412 and Proxy Volume 534 on Destination Storage Array 410. At step 16, both Proxy Volume 534 and Destination Volume 412 are created on Destination Storage Array 410.

At step 17, Migration Controller 522 sends a message to the Host Agent 508 in each host computer in the cluster requesting that a passive path be built to Proxy Volume 534 from the host computer. For example, at step 17 Migration Controller 522 may pass the WWNs (World Wide Names) of Source Volume 408 and Destination Volume 412 to the Host Agent 508 of each host computer in the cluster. Host Agent 508 in each host computer in the cluster may then call an operating system command to rescan the bus at step 18 to find the newly created Proxy Volume 534. Then Host Agent 508 calls Customized MPIO Plugin 506 in each host computer in the cluster to create a mapping between the Source Volume 408 and the Destination Volume 412. At step 19 Customized MPIO Plugin 506 in each host computer in the cluster sends an SCSI INQUIRY command to Destination Storage Array 410 with vendor specific vital product data (VPD). Then at step 20 the Customized MPIO Plugin 506 in each host computer in the cluster builds a passive path to the Proxy Volume 534. At step 21 the volume migration setup phase is completed in the Migration Controller 522.

Figure 11:
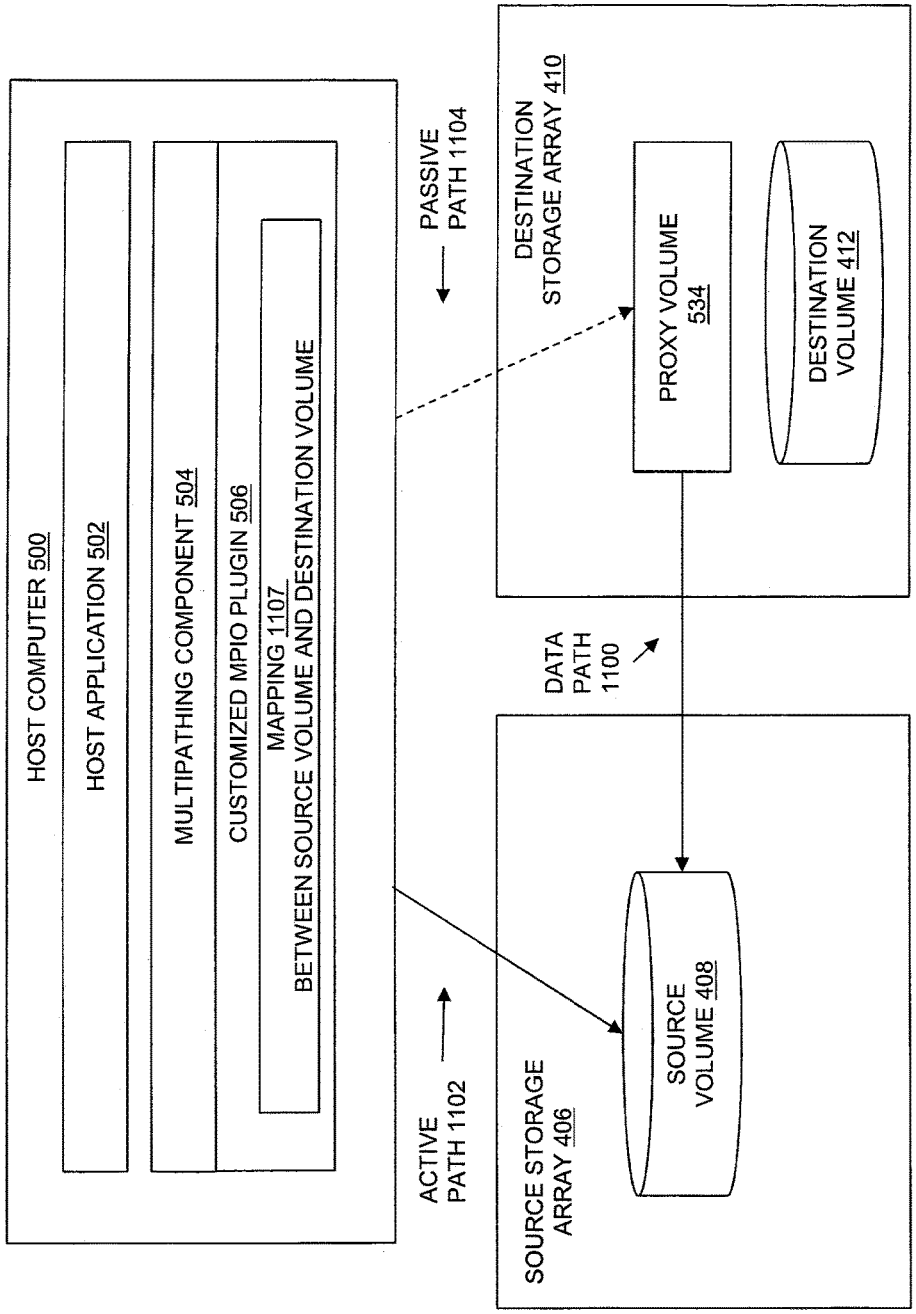
FIG. 11 is a block diagram showing one of the host computers, the source storage array, and the destination storage array in the cluster of FIG. 4, after a step of volume migration setup in some embodiments.

FIG. 11 is a block diagram showing an example of one of the host computers, the source storage array, and the destination storage array in Cluster 400, after the volume migration setup phase has been completed in some embodiments. Each one of the host computers in the Cluster 400 may be configured similarly to the example of Host Computer 500 shown in FIG. 11 after the volume migration setup phase has been completed. As shown in the example of FIG. 11, an Active Path 1102 for accessing Source Volume 408 is present from Host Computer 500 to Source Volume 408 on Source Storage Array 406, a Passive Path 1104 is also present between Host Computer 500 and Proxy Volume 534, and a Data Path 100 is present between Proxy Volume 534 and Source Volume 408. A Mapping 1107 in the Customized MPIO Plugin 506 stores a mapping between the Source Volume 408 and the Destination Volume 412.

Figure 12:
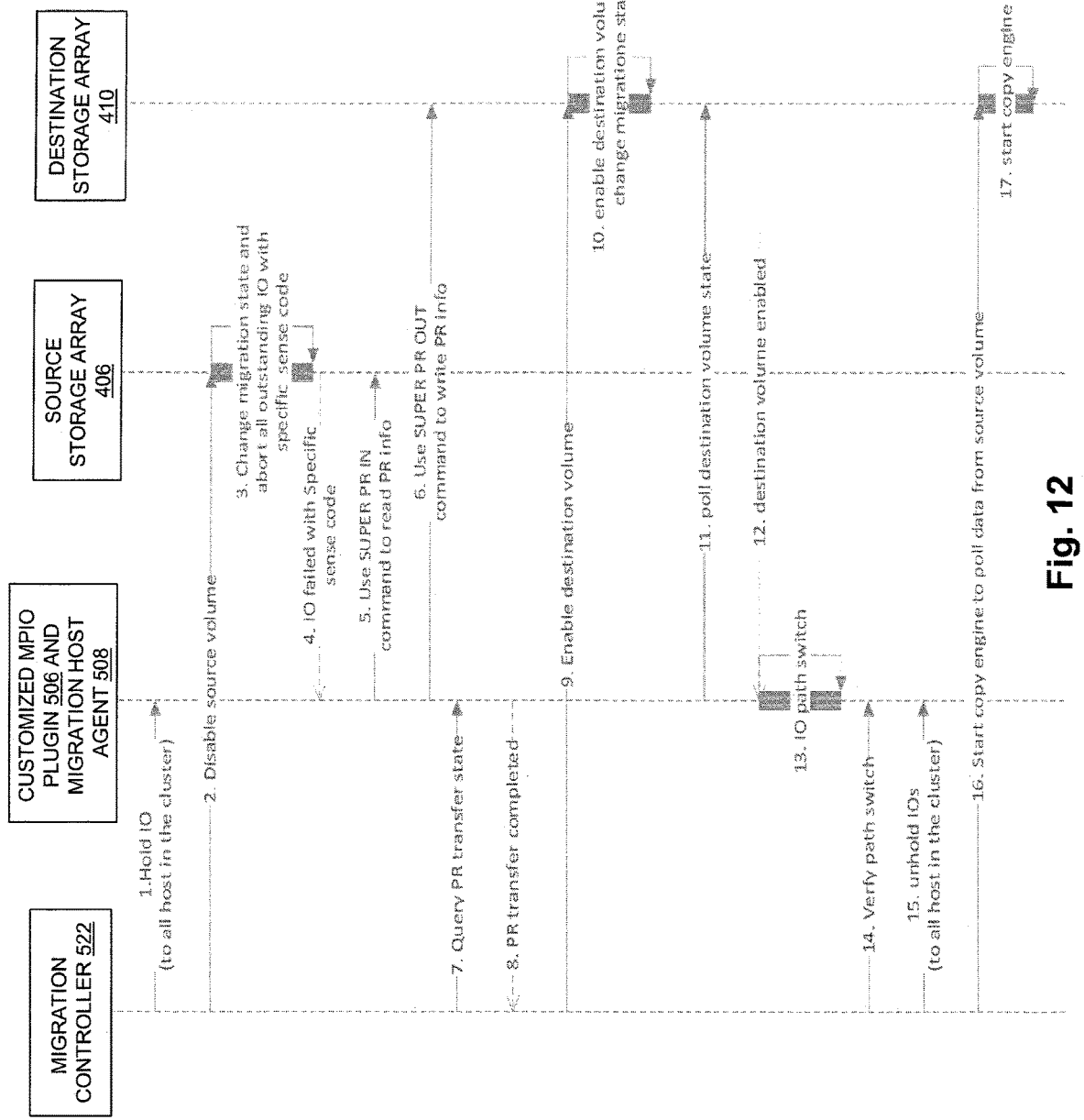
FIG. 12 is a sequence diagram illustrating a step of starting volume migration in some embodiments.

FIG. 12 is a sequence diagram illustrating the step of starting volume migration in some embodiments, as in step 804 of FIG. 8. Several operations are performed during the steps shown in FIG. 12. First, Source Volume 408 is disabled such that it does not service standard host I/O requests that are received from host computers in the Cluster 400. In addition, SCSI Persistent Reservation (PR) information regarding Source Volume 408 is transferred from the Source Storage Array 406 to the Destination Storage Array 410 using non-standard, vendor specific commands. The PR information transferred is reservation information that enables storage volumes such as Source Volume 408 to be used by multiple host computers in a cluster environment such as Cluster 400. Such PR information may include access reservation information such as the identities of one or more of the host computers in Cluster 400 that are permitted to access the Source Volume 408, and one of the host computers in Cluster 400 that is currently permitted to write to Source Volume 408. An example of the transferred PR information is defined in SCSI Primary Commands-3 (SPC-3) and later versions, such as Working Draft SCSI Primary Commands-4 (SPC-4), published Jun. 23, 2010. Also during the steps shown in FIG. 12, Proxy Volume 534 is enabled so that Proxy Volume 534 can handle host I/O requests that are received by Destination Storage Array 410 from the host computers in Cluster 400 during the migration process. Further during the steps shown in FIG. 12, an I/O path switch operation is performed, causing the path from each host computer in the Cluster 400 (e.g. from Host Computer 500) to the Proxy Volume 534 to become the active path for accessing Source Volume 408, and also causing the path from each host computer in the Cluster 400 (e.g. from Host Computer 500) to the Source Volume 408 to be changed to a passive (unused) path.

At the beginning of the steps shown in FIG. 12, the Source Volume 408 is servicing host I/O requests received from the hosts computers in Cluster 400, and the Destination Volume 412 is in the DISABLED state, in which no host I/O requests are allowed.

At step 1 Migration Controller 522 sends a hold I/O message to each one of the host computers in the Cluster 400. The hold I/O messages sent at step 1 cause all the host computers in the Cluster 400 to stop sending host I/O requests that are directed to Source Volume 408 to Source Storage Array 406. For example, Migration Controller 522 may send a hold I/O request to Host Agent 508 in each host computer, causing Host Agent 508 to issue one or more IOCTL commands to the Customized MPIO Plugin 506 to cause Customized MPIO Plugin 506 to begin queueing all host I/O requests that are directed to the Source Volume 408 that are received from the host application, e.g. in an internal queue contained in the Customized MPIO Plugin 506 of each host computer in Cluster 400, without forwarding such requests to Source Storage Array 406.

At step 2, Migration Controller 522 sends a disable volume request to Source Storage Array 406 to cause Source Storage Array 406 to disable Source. Volume 408. At step 3, the disable volume request from Migration Controller 522 causes Source Storage Array 406 to change the migration state of the Source Volume 408 to DISABLED so that all incoming standard host I/O requests directed to Source Volume 408 are rejected by Source Storage Array 406, and all outstanding host I/O requests directed to Source Volume 408 are aborted. At step 4, while rejecting standard host I/O requests directed to Source Volume 408 and aborting the outstanding host I/O requests directed to Source Volume 408, Source Storage Array 406 returns a non-standard failure status code to the host computers in the Cluster 400. For example, at step 4 Source Storage Array 406 may return a predefined, vendor specific ASC/Q sense code, e.g. 0x09/0x1/0x1 or some other specific pre-defined code.

The Customized MPIO Plugin 506 in each one of the host computers of Cluster 400 receives and recognizes the non-standard failure status code returned at step 4 by the Source Storage Array 406. In response recognition of the non-standard failure status code, at step 5 the Customized MPIO Plugin 506 in each host computer uses one or more non-standard vendor specific SCSI commands to read PR information regarding Source Volume 408 from Source Storage Array 406. Such PR information may, for example, include PR registration keys and/or reservations previously made with regard to Source Volume 408. An example of the vendor specific SCSI command used to read PR information at step 5 is the SUPER PERSISTENT RESERVE IN vendor specific command 600 shown in FIG. 6.

At step 6, the Customized MPIO Plugin 506 in each one of the host computers may uses one or more non-standard vendor specific SCSI command to set the PR information regarding Destination Volume 412 in Destination Storage Array 410 to match the PR information regarding Source Volume 408 that was received from Source Storage Array 406. An example of the vendor specific SCSI command that is used to write PR information at step 6 is the SUPER PERSISTENT RESERVE OUT vendor specific command 700 shown in FIG. 7.

Though both Source Volume 408 and Destination Volume 412 are disabled from being used to process standard SCSI I/O requests that are received from the host computers during steps 5 and 6, Migration Aware SCSI Semantics Driver 516 and Migration Aware SCSI Semantics Driver 530 operate to handle the non-standard vendor specific SCSI commands that are sent from the host computers to Source Storage Array 406 and Destination Storage Array 410 in steps 5 and 6, even while processing of standard SCSI commands directed to Source Volume 408 and Destination Volume 412 is disabled. Since more than one of the host computers in the cluster may issue the non-standard vendor specific SCSI command used to write PR information at step 6, in some embodiments Migration Aware SCSI Semantics Driver 530 may operate to accept only the first complete set of PR information that it receives at step 6, e.g. the PR information in one or more non-standard vector specific SCSI commands that are received from a single one of the host computers in Cluster 400.

At step 7 the Migration Controller 522 queries the Host Agent 508 in each of the host computers in the Cluster 400 to determine whether the PR information for Source Volume 408 has been transferred to Destination Storage Array 410. At step 8, after the PR information for Source Volume 408 has been successfully transferred to Destination Storage Array 410, Host Agent 508 in at least one of the host computers of Cluster 400 sends an indication to Migration Controller 522 that the PR information for Source Volume 408 has been transferred to Destination Storage Array 410.

At step 9, the Customized MPIO Plugin 506 in each one of the host computers in Cluster 400 responds to the indication received at step 8 by sending an enable volume request to the Destination Storage Array 410, requesting that Destination Volume 412 be enabled to receive host I/O requests. At step 10, in response to at least one of the enable volume requests, the Destination Storage Array 410 enables Destination Volume 412 for host I/O requests, e.g. by enabling Proxy Volume 534 and Destination Volume 412, and changes the state of Destination Volume 412 to ENABLED, to indicate to the host computers that Destination Volume 412 is enabled for use when processing host I/O requests subsequently received by Destination Storage Array 410. Host I/O requests processed after Destination Volume 412 is enabled at step 10 are processed by Proxy Volume 534 while Proxy Volume 534 exists in the Destination Storage Array 410, and write I/O operations are forwarded to both Destination Volume 412 and Source Volume 408 by Proxy Volume 534. Host I/O requests are processed according to the PR information for Source Volume 408 that was previously transferred to Destination Storage Array 410 at step 6. Accordingly, in the case where the PR information for Source Volume 408 that was transferred to Destination Storage Array 410 included access reservation information containing the identities of a set of the host computers in Cluster 400 that were permitted to access the Source Volume 408, only those host computers in Cluster 400 that were permitted to access the Source Volume 408 are permitted to access the Destination Volume 412, e.g. through Proxy Volume 534 or directly. Similarly, in the case where the PR information for Source Volume 408 that was transferred to Destination Storage Array 410 included access reservation information containing the identity of a host computer in Cluster 400 that was currently permitted to write the Source Volume 408, only the host computer in Cluster 400 that was currently permitted to write Source Volume 408 is currently permitted to write the Destination Volume 412, e.g. through Proxy Volume 534 or directly.

At step 11, Customized MPIO Plugin 506 in each host computer in the Cluster 400 polls Destination Storage Array 410 for the state of the Destination Volume 412, which is reported as ENABLED by Destination Storage Array 410 at step 12.

At step 13, the Customized MPIO Plugin 506 in each host computer in the Cluster 400 performs an I/O path switch such that subsequent host I/O requests directed to Source Volume 408 are sent from the host computers in Cluster 400 to Destination Storage Array 410. In other words, at step 13 the Customized MPIO Plugin 506 in each host computer in Cluster 400 sets the active path for Source Volume 408 to the path to the Proxy Volume 534 in Destination Storage Array 410, so that Proxy Volume 534 can forward those host I/O requests to both Destination Volume 412 and Source Volume 408 until Proxy Volume 534 is later removed from Destination Storage Array 410 after the volume migration is completed.

At step 14, Migration Controller 522 verifies with the Host Agent 508 in each host computer in Cluster 400 that the active path for Source Volume 408 has been set to the path to Proxy Volume 534.

After the verification at step 14 is complete, at step 15 Migration Controller 522 sends an un-hold I/O message to each one of the host computers in the Cluster 400. The un-hold I/O messages sent at step 15 causes all the host computers in the Cluster 400 to resume issuing host I/O requests that are directed to Source Volume 408, including sending the host I/O requests directed to the Source Volume 408 that were previously stored in the internal queue in the Customized MPIO Plugin 506 in each one of the host computers in the Cluster 400. Because the active path for Source Volume 408 was switched by Customized MPIO Plugin 506 in each one of the host computers in Cluster 400 to the path to Proxy Volume 534 in step 13, the host I/O requests directed to Source Volume 408 (including the internally queued Host I/O requests) are then sent by the host computers in Cluster 400 to Destination Storage Array 410, in which Proxy Volume 534 forwards those write host I/O requests to both Destination Volume 412 and Source Volume 408, so that the contents of Source Volume 408 is maintained consistent with the writes made to Destination Volume 412, in order to support the possibility of the volume migration being cancelled by the user before it is completed.

At step 16, Migration Controller 522 requests that the Copy Engine 526 begin operation in Destination Storage Array 410. At step 17, Copy Engine 526 begins copying the contents of Source Volume 408 to Destination Volume 412.

Figure 13:
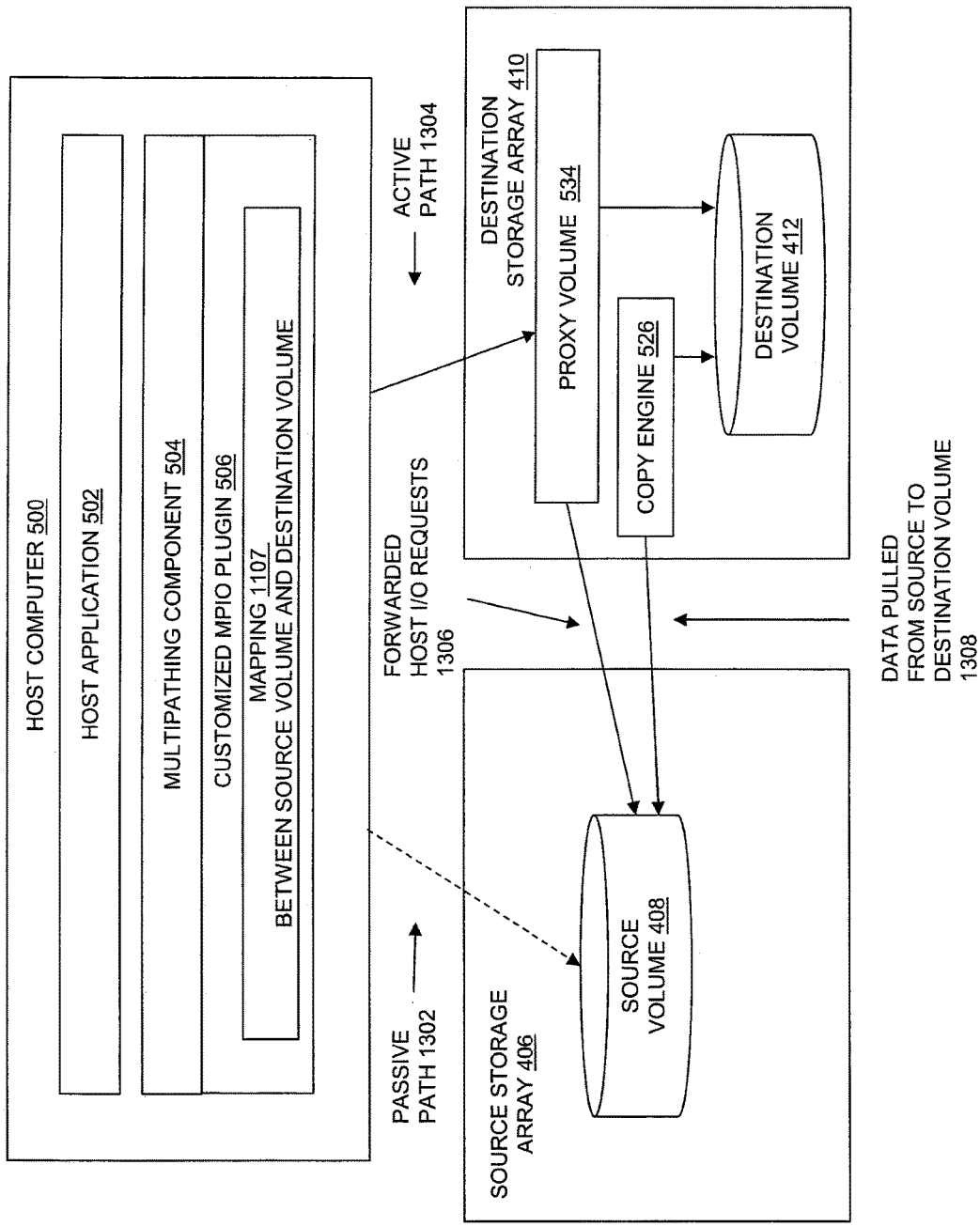
FIG. 13 is a block diagram showing one of the host computers, the source storage array, and the destination storage array in the cluster of FIG. 4, after a step of starting volume migration in some embodiments.

FIG. 13 is a block diagram showing an example of one of the host computers, the source storage array, and the destination storage array in Cluster 400, the volume migration has been started in some embodiments. Each one of the host computers in the Cluster 400 may be configured similarly to the example of Host Computer 500 shown in FIG. 13 after the volume migration has been started (e.g. after step 804 in FIG. 8). As shown in the example of FIG. 13, the path between Host Computer 500 and Source Volume 408 is no longer active, as shown by Passive Path 1302. In contrast, the path from Host Computer 500 to Proxy Volume 534 has become the active path for Source Volume 408, as shown by Active Path 1304. Accordingly, host I/O requests from Host Application 502 directed to Source Volume 408 are passed on Active Path 1304 to Destination Storage Array 410 in response to Mapping 1107 in the Customized MPIO Plugin 506, and received by Proxy Volume 534. Proxy Volume 534 then both i) forwards the write I/O requests it receives to Source Volume 408, as shown by Forwarded Host I/O Requests 1306, and ii) also forwards the write I/O requests it receives to Destination Volume 412, in order to keep the data in Source Volume 408 and Destination Volume 412 synchronized during the migration process to support the where the user cancels the migration process during the migration process, to revert back to using Source Volume 408 in Source Storage Array 406. At the same time, Copy Engine 526 copies the data stored in Source Volume 408 to Destination Volume 412, as shown by Data Pulled from Source to Destination Volume 1308.

Figure 14:
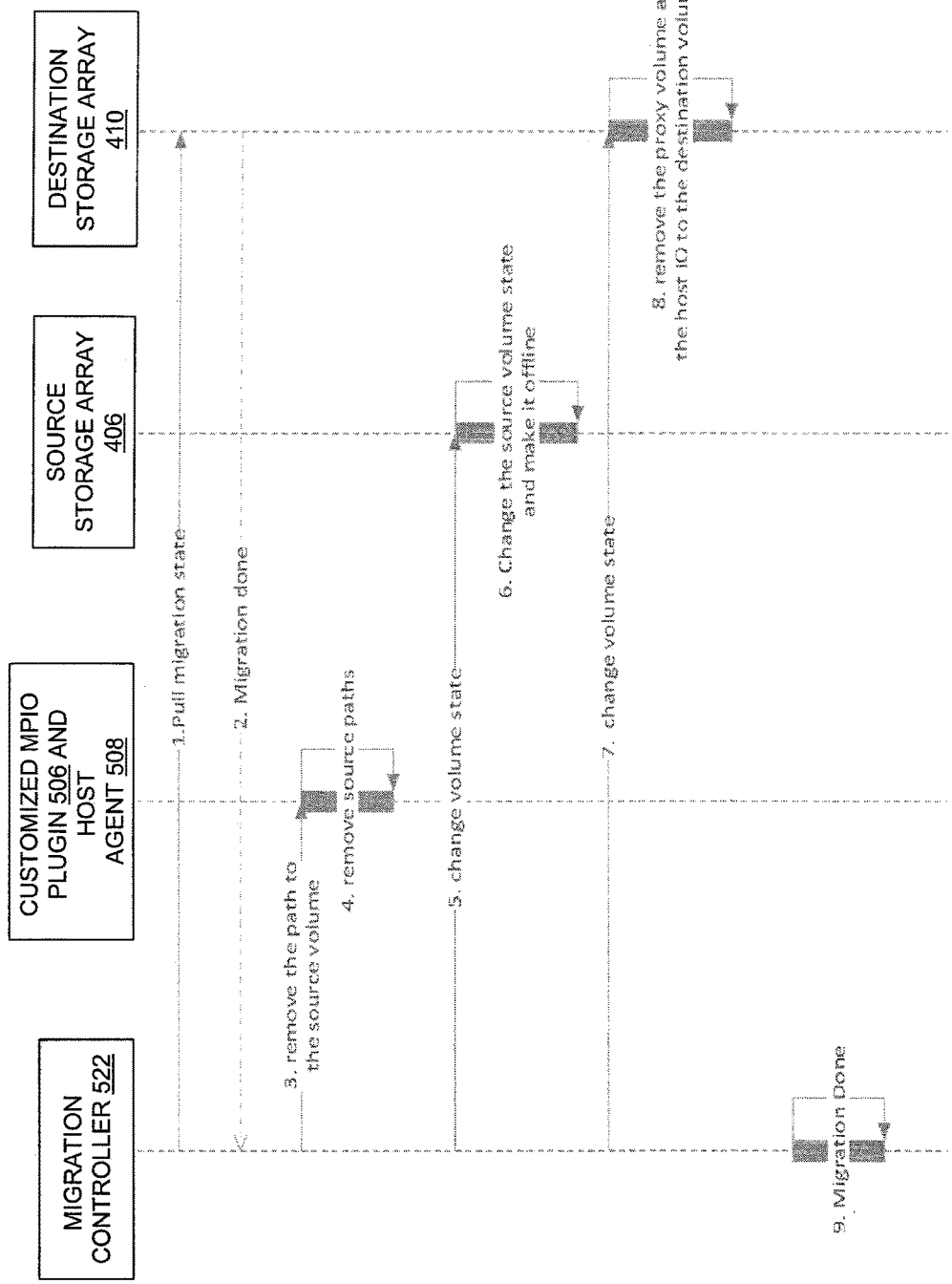
FIG. 14 is a sequence diagram illustrating a step of post volume migration processing as performed in some embodiments.

FIG. 14 is a sequence diagram illustrating the step of post volume migration processing in some embodiments, as in step 808 of FIG. 8. At step 1 in FIG. 14, the Migration Controller 522 pulls the current migration state from the Copy Engine 526 in Destination Storage Array 410. When all the data stored in Source Volume 408 is copied from Source Volume 408 to Destination Volume 412, at step 2 the Copy Engine 526 returns a MIGRATION DONE state to the Migration Controller 522. Migration Controller 522 then performs a number of clean-up tasks. Specifically, at step 3, Migration Controller 522 sends a request to the Host Agent 508 in each host computer in the Cluster 400 to remove all paths to the Source Volume 408. At step 4, the Customized MPIO Plugin 506 in each host computer in the cluster removes the path from the host computer to the Source Volume 408. At step 5, Migration Controller 522 sends a request to Source Storage Array 406 to change the state of Source Volume 408 to OFFLINE. At step 6 Source Storage Array 406 responds to the request by changing the state of Source Volume 408 to OFFLINE. At step 7, Migration Controller 522 sends a request to Destination Storage Array 410 to cause Destination Storage Array 410 to change the state of Destination Volume 412, in order to cause host I/O requests directed by a host application to Source Volume 408 but sent by a host computer to Destination Storage Array 410 in response to Mapping 1107 be processed directly on Destination Volume 412, without intervention by Proxy Volume 534. At step 8, Destination Storage Array 410 responds to the request at step 7 by removing Proxy Volume 534 from Destination Storage Array 410, causing subsequent host I/O requests directed by host applications to Source Volume 408 but sent by a host computer to Destination Storage Array 410 to be processed directly on Destination Volume 412. At step 9, the Migration Controller 522 completes the volume migration process.

Figure 15:
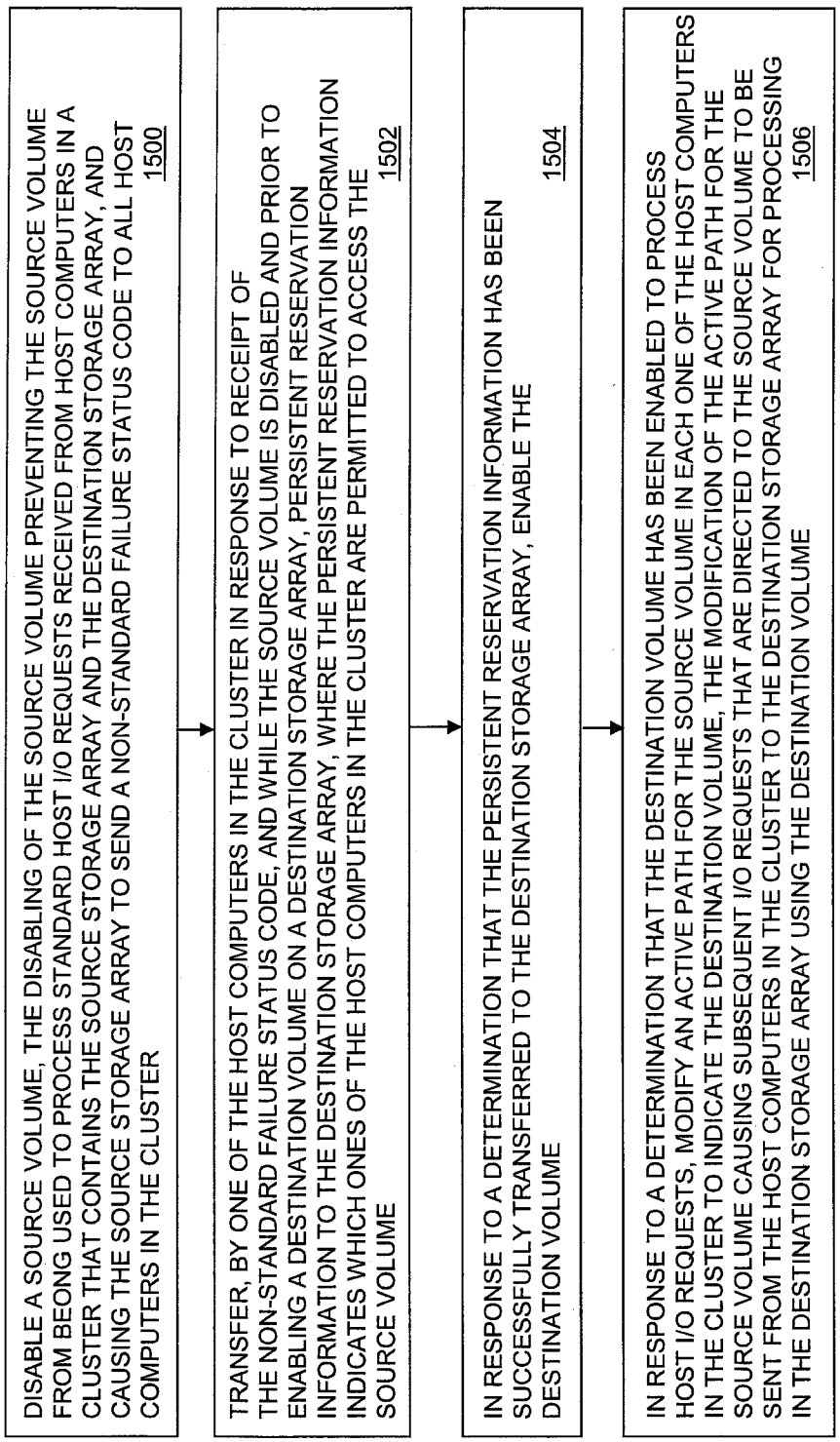
FIG. 15 is a flow chart showing steps performed in some embodiments.

FIG. 15 is a flow chart showing an example of steps performed in some embodiments to perform volume migration. At step 1500, the source volume that is to be migrated is disabled. Disabling the source volume at step 1500 prevents the source volume from being used to process standard host I/O requests that are received by the source storage array from host computers in a cluster that contains the source storage array and the destination storage array, and causes the source storage array to send a non-standard failure status code to all the host computers in the cluster.

At step 1502, in response to receipt of the non-standard failure status code, and while the source volume is disabled and prior to enabling a destination volume on a destination storage array to process host I/O requests, one of the host computers in the cluster transfers persistent reservation information to the destination storage array. The persistent reservation information at least in part indicates which ones of the host computers in the cluster are permitted to access the source volume.

At step 1504, in response to a determination that the persistent reservation information has been successfully transferred to the destination storage array, the destination volume is enabled to process host I/O requests.

At step 1506, in response to a determination that the destination volume has been enabled to process host I/O requests, an active path for the source volume is modified in each one of the host computers in the cluster to indicate the destination volume. The modification of the active path for the source volume causes subsequent I/O requests from applications that are directed to the source volume to be sent from the host computers in the cluster to the destination storage array for processing in the destination storage array using the destination volume.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing seamless migration of a source volume located in a source storage array to a destination storage array, comprising the steps of:

disabling the source volume, wherein disabling the source volume prevents the source volume from being used to process standard host I/O requests and causes the source storage array to send a non-standard failure status code to a plurality of host computers in a cluster that also includes the source storage array and the destination storage array;

transferring, by at least one of the host computers in the cluster in response to receipt of the non-standard failure status code, and while the source volume is disabled and prior to enabling a destination volume in the destination storage array to process host I/O requests, persistent reservation information to the destination storage array, wherein the persistent reservation information indicates which ones of the host computers in the cluster are permitted to access the source volume;

in response to determining that the persistent reservation information has been successfully transferred to the destination storage array, enabling the destination volume to process host I/O requests in accordance with the transferred persistent reservation information; and in response to determining that the destination volume has been enabled to process host I/O requests, modifying an active path for accessing the source volume in each one of the host computers in the cluster to indicate the destination volume, wherein the modification of the active path for accessing the source volume causes subsequent I/O requests that are directed to the source volume to be sent from the host computers in the cluster to the destination storage array for processing in the destination storage array using the destination volume.

2. The method of claim 1, further comprising:

prior to disabling the source volume, sending a hold I/O message to all host computers in the cluster, wherein the hold I/O message causes the host computers in the cluster to stop issuing host I/O requests that are directed to the source volume to the source storage array and to instead create an internal queue in each one of the host computers in the cluster storing host I/O requests that are directed to the source volume; and in response to determining that the active path for accessing the source volume in each one of the host computers in the cluster has been modified to indicate the destination volume, sending a resume I/O message to all the host computers in the cluster, wherein the resume I/O message causes the host computers in the cluster to resume issuing host I/O requests that are directed to the source volume using the modified active path for accessing the source volume, including the host I/O requests directed to the source volume that are stored in the internal queue in each one of the host computers in the cluster.

3. The method of claim 2, wherein the host computers in the cluster each include a multi-pathing component and a customized plugin component added to the multi-pathing component; and wherein transferring the persistent reservation information to the destination storage array by at least one of the host computers in the cluster comprises the customized plugin component added to the multi-pathing component in at least one of the host computers in the cluster transferring the persistent reservation information from the source storage array to the destination storage array.

4. The method of claim 3, wherein the persistent reservation information further indicates one of the host computers in the cluster that is currently permitted to write to the source volume.

5. The method of claim 4, wherein transferring the persistent reservation information from the source storage array to the destination storage array further comprises the customized plugin component added to the multi-pathing component in at least one of the host computers in the cluster obtaining the persistent reservation information from the source storage array at least in part by sending a non-standard read persistent reservations command to the source storage array.

6. The method of claim 5, wherein transferring the persistent reservation information from the source storage array to the destination storage array further comprises the customized plugin component added to the multi-pathing component in at least one of the host computers in the cluster sending the persistent reservation information obtained from the source storage array to the destination storage array by sending a non-standard set persistent reservations command to the source storage array.

7. The method of claim 6, wherein modifying the active path to the source volume in each one of the host computers in the cluster to indicate the destination volume comprises modifying an active path associated with the source volume in the customized multi-pathing component added to the multi-path component in each one of the host computers in the cluster.

8. The method of claim 7, wherein the destination storage array further includes a migration controller component; and wherein sending the hold I/O message to all host computers in the cluster comprises the migration controller component in the destination storage array sending the hold I/O messages to all host computers in the cluster.

9. The method of claim 8, wherein disabling the source volume comprises the migration controller component in the destination storage array sending a message to the source storage array that causes the source storage array to prevent the source volume from processing standard host I/O requests from the host computers in the cluster.

10. The method of claim 9, wherein disabling the source volume further causes the source storage array to abort all outstanding host I/O requests in the source storage array that are directed to the source volume and send an I/O failed message to all the host computers in the cluster.

11. The method of claim 10, further comprising:
creating a proxy volume for the destination volume in the destination storage array, wherein the proxy volume for the destination volume processes host I/O requests sent from the host computers in the cluster to the destination storage array and directed to the destination volume at least in part by performing write I/O requests in the host I/O requests sent from the host computers in the cluster to the destination storage array on both the destination volume and the source volume.

12. The method of claim 11, further comprising:
after sending the resume I/O message to all the host computers in the cluster, beginning to copy data stored in the source volume to the destination volume; and
when all data has been copied from the source volume to the destination volume, removing the proxy volume from the destination storage array so that host I/O requests sent from the host computers in the cluster to the destination storage array and directed to the destination volume are subsequently processed by the destination storage array directly on the destination volume.

13. A non-transitory, computer-readable medium including instructions which, when executed by processing units, cause the processing units to perform a method of providing seamless migration of a source volume located in a source storage array to a destination storage array, the method comprising the steps of:
disabling the source volume, wherein disabling the source volume prevents the source volume from being used to process standard host I/O requests and causes the source storage array to send a non-standard failure status code to a plurality of host computers in a cluster that also includes the source storage array and the destination storage array;
transferring, by at least one of the host computers in the cluster in response to receipt of the non-standard failure status code, and while the source volume is disabled and prior to enabling a destination volume in the destination storage array to process host I/O requests, persistent reservation information to the destination storage array, wherein the persistent reservation information indicates which ones of the host computers in the cluster are permitted to access the source volume;
in response to determining that the persistent reservation information has been successfully transferred to the destination storage array, enabling the destination volume to process host I/O requests in accordance with the transferred persistent reservation information; and
in response to determining that the destination volume has been enabled to process host I/O requests, modifying an active path for accessing the source volume in each one of the host computers in the cluster to indicate the destination volume, wherein the modification of the active path for accessing the source volume causes subsequent I/O requests that are directed to the source volume to be sent from the host computers in the cluster to the destination storage array for processing in the destination storage array using the destination volume.

14. The non-transitory, computer-readable medium of claim 13, wherein the method of providing seamless migration of a source volume located in a source storage array to a destination storage array that is caused to be performed by the processing units when the instructions are executed by the processing units further comprises:
prior to disabling the source volume, sending a hold I/O message to all host computers in the cluster, wherein the hold I/O message causes the host computers in the cluster to stop issuing host I/O requests that are directed to the source volume to the source storage array and to instead create an internal queue in each one of the host computers in the cluster storing host I/O requests that are directed to the source volume; and
in response to determining that the active path for accessing the source volume in each one of the host computers in the cluster has been modified to indicate the destination volume, sending a resume I/O message to all the host computers in the cluster, wherein the resume I/O message causes the host computers in the cluster to resume issuing host I/O requests that are directed to the source volume using the modified active path for accessing the source volume, including the host I/O requests directed to the source volume that are stored in the internal queue in each one of the host computers in the cluster.

15. The non-transitory, computer-readable medium of claim 14, wherein the method of providing seamless migration of a source volume located in a source storage array to a destination storage array that is caused to be performed by the processing units when the instructions are executed by the processing units further comprises:
wherein transferring the persistent reservation information to the destination storage array by at least one of the host computers in the cluster comprises the customized plugin component added to the multi-pathing component in at least one of the host computers in the cluster transferring the persistent reservation information from the source storage array to the destination storage array.

16. The non-transitory, computer-readable medium of claim 15, wherein the persistent reservation information further indicates one of the host computers in the cluster that is currently permitted to write to the source volume.

17. The non-transitory, computer-readable medium of claim 16, wherein the method of providing seamless migration of a source volume located in a source storage array to a destination storage array that is caused to be performed by the processing units when the instructions are executed by the processing units further comprises:
wherein transferring the persistent reservation information from the source storage array to the destination storage array further comprises the customized plugin component added to the multi-pathing component in at least one of the host computers in the cluster obtaining the persistent reservation information from the source storage array at least in part by sending a non-standard read persistent reservations command to the source storage array.

18. The non-transitory, computer-readable medium of claim 17, wherein the method of providing seamless migration of a source volume located in a source storage array to a destination storage array that is caused to be performed by the processing units when the instructions are executed by the processing units further comprises:
wherein transferring the persistent reservation information from the source storage array to the destination storage array further comprises the customized plugin component added to the multi-pathing component in at least one of the host computers in the cluster sending the persistent reservation information obtained from the source storage array to the destination storage array by sending a non-standard set persistent reservations command to the source storage array.

19. The non-transitory, computer-readable medium of claim 18, wherein the method of providing seamless migration of a source volume located in a source storage array to a destination storage array that is caused to be performed by the processing units when the instructions are executed by the processing units further comprises:

creating a proxy volume for the destination volume in the destination storage array, wherein the proxy volume for the destination volume processes host I/O requests sent from the host computers in the cluster to the destination storage array and directed to the destination volume at least in part by performing write I/O requests in the host I/O requests sent from the host computers in the cluster to the destination storage array on both the destination volume and the source volume;
after sending the resume I/O message to all the host computers in the cluster, beginning to copy data stored in the source volume to the destination volume; and
when all data has been copied from the source volume to the destination volume, removing the proxy volume from the destination storage array so that host I/O requests sent from the host computers in the cluster to the destination storage array and directed to the destination volume are subsequently processed by the destination storage array directly on the destination volume.

20. A system for providing seamless migration of a source volume, comprising:
a source storage array containing the source volume, the source storage array including memory storing instructions for execution on one or more processing units, and wherein the source storage array is configured and arranged to disable the source volume to prevent the source volume from being used to process standard host I/O requests, and to send a non-standard failure status code to a plurality of host computers that are located in a cluster that also includes the source storage array and a destination storage array;
at least one of the host computers in the cluster configured and arranged to, in response to receipt of the non-standard failure status code, and while the source volume is disabled and prior to enabling a destination volume in the destination storage array to process host I/O requests, transfer persistent reservation information to the destination storage array, wherein the persistent reservation information indicates which ones of the host computers in the cluster are permitted to access the source volume;
wherein the destination storage array is configured and arranged to, in response to a determination that the persistent reservation information has been successfully transferred to the destination storage array, enable the destination volume to process host I/O requests in accordance with the transferred persistent reservation information; and
wherein each one of the host computers in the cluster is configured and arranged to, in response to a determination that the destination volume has been enabled to process host I/O requests, modify an active path for accessing the source volume to indicate the destination volume, wherein the modification of the active path for accessing the source volume causes the host computers in the cluster to send subsequent I/O requests that are directed to the source volume from the host computers in the cluster to the destination storage array for processing in the destination storage array using the destination volume.

* * * * *